United States Patent
Satpathy et al.

(10) Patent No.: US 9,910,792 B2
(45) Date of Patent: Mar. 6, 2018

(54) COMPOSITE FIELD SCALED AFFINE TRANSFORMS-BASED HARDWARE ACCELERATOR

(71) Applicant: Intel Corporation, Santa Clara, CA (US)

(72) Inventors: Sudhir K. Satpathy, Hillsboro, OR (US); Sanu K. Mathew, Hillsboro, OR (US); Vikram B. Suresh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/095,783

(22) Filed: Apr. 11, 2016

(65) Prior Publication Data

US 2017/0293572 A1  Oct. 12, 2017

(51) Int. Cl.
*H04L 9/06* (2006.01)
*G06F 12/14* (2006.01)
*H04L 9/30* (2006.01)

(52) U.S. Cl.
CPC ........ *G06F 12/1408* (2013.01); *H04L 9/3093* (2013.01); *G06F 2212/1052* (2013.01)

(58) Field of Classification Search
CPC ... G06F 7/726; G06F 12/1408; H04L 9/0618; H04L 9/0631; H04L 9/0693; H04L 9/3093; H04L 2209/122
See application file for complete search history.

(56) References Cited

U.S. PATENT DOCUMENTS

| | | |
|---|---|---|
| 2006/0109981 A1 | 5/2006 | Sexton |
| 2009/0003589 A1 | 1/2009 | Mathew et al. |
| 2009/0279688 A1 | 11/2009 | Michaels et al. |
| 2010/0046745 A1 | 2/2010 | Hanatani et al. |
| 2010/0074440 A1 | 3/2010 | Lee et al. |
| 2010/0232597 A1 | 9/2010 | Lu et al. |
| 2013/0236005 A1 | 9/2013 | Ikeda et al. |
| 2014/0169553 A1 | 6/2014 | Chen et al. |
| 2015/0067302 A1 | 3/2015 | Gueron |

(Continued)

FOREIGN PATENT DOCUMENTS

KR  1020100059571 A  6/2010

OTHER PUBLICATIONS

International Search Report and Written Opinion for PCT/US2017/022152, dated Jun. 13, 2017, 13 pages.

(Continued)

*Primary Examiner* — Kevin Bechtel
(74) *Attorney, Agent, or Firm* — Lowenstein Sandler LLP

(57) ABSTRACT

A processing system includes a memory and a cryptographic accelerator operatively coupled to the memory. The cryptographic accelerator performs a split substitute byte operation within two paths of a cryptographic round by determining a first output from a first path by applying a mapped affine transformation to an input bit sequence represented by an element of a composite field of a finite-prime field, wherein the first output is represented by a first element of the composite field of the finite-prime field, and a second output from a second path by applying a scaled mapped affine transformation to the input bit sequence, wherein the second output is represented by a second element of the composite field and is equal to a multiple of the first output in the composite field.

19 Claims, 17 Drawing Sheets

(56) References Cited

U.S. PATENT DOCUMENTS

2015/0086007 A1* 3/2015 Mathew ............... H04L 9/0631
 380/28
2015/0341168 A1 11/2015 Gueron

OTHER PUBLICATIONS

Mathew, Sanu K. et al., "53 Gbps Native GF(2 4)2 Composite-Field AES-Encrypt/Decrypt Accelerator for Content-Protection in 45 nm High-Performance Microprocessors," IEEE Journal of Solid-State Circuits, vol. 46, No. 4, pp. 767-775 (Apr. 2011).
Mathew, Sanu et al., "340mV-1.1V, 289Gbps/W, 2090-gate NanoAES Hardware Accelerator with Area-optimized Encrypt/Decrypt GF(2 4)2 Polynomials in 22nm tri-gate CMOS," Symposium on VLSI Circuits Digest of Technical papers, pp. 131-132 (2014).
Wang, Zaho et al., "Application of the Composite Field in the Design of an Improved AES S-box Based on Inversion," The Third International Conference on Communications, Computation, Networks and Technologies, pp. 23-29 (2014).
Intel Corporation, Shay Gueron, "Intel® Advanced Encryption Standard (AES) New Instructions Set," Revision 3.0, 81 pages, May 2010.
International Search Report and Written Opinion for PCT/US2016/046905, 10 pages, dated Dec. 7, 2016.

\* cited by examiner $GF(2^8)$    $y = A.x + b$                    $2y = T.A.x + T.b$ $\downarrow M$                    $\downarrow M$ $GF(2^4)^2$   $y = M.A.M^{-1}.x + M.b$         $2y = M.T.A.M^{-1}.x + M.T.b$
            $= A'.x + b'$                     $= A''.x + b''$ $$T = \begin{bmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 1 & 0 & 0 & 0 & 1 & 0 & 0 & 0 \\ 1 & 0 & 0 & 0 & 0 & 1 & 0 & 0 \\ 0 & 0 & 0 & 0 & 0 & 0 & 1 & 0 \\ 1 & 0 & 0 & 0 & 0 & 0 & 0 & 1 \\ 1 & 0 & 0 & 0 & 0 & 0 & 0 & 0 \end{bmatrix}$$

FIG. 4A

Mix cols $(x_0, x_1, x_2, x_3)$

COMPOSITE FIELD SCALED AFFINE TRANSFORMS-BASED HARDWARE ACCELERATOR

This disclosure is related generally to computing devices and more specifically to computing devices for performing cryptographic operations.

BACKGROUND

Cryptographic methods may be used to protect confidential information in computer systems and other electronic devices. For example, an encryption operation may be performed, in which a series of transformations as specified by a chosen cryptographic algorithm are performed on a plaintext input data (e.g., a sequence of bits representing text, numbers, intelligible characters, etc.) using an encryption key (e.g., a sequence of bits) to produce encrypted data (cipher text). It is generally practically unfeasible to determine the unencrypted plaintext data from the encrypted data, without knowing the cryptographic key. If the cryptographic key is known, a decryption (sometimes referred to as inverse cipher) operation may be performed on the encrypted data to reproduce the corresponding plaintext (unencrypted data).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4A schematically illustrates transformation logic that may be employed to implement transformation within a substitute byte (S-Box) of FIG. 3 from a finite-prime field $GF(2^8)$ to a composite-field $GF(2^4)^2$, in accordance with one or more aspects of the present disclosure.

FIG. 4B schematically illustrates logic that may be employed to implement MixColumns calculations from the outputs of the S-Box of FIG. 3, in accordance with one or more aspects of the present disclosure.

DETAILED DESCRIPTION

Figure 1A:
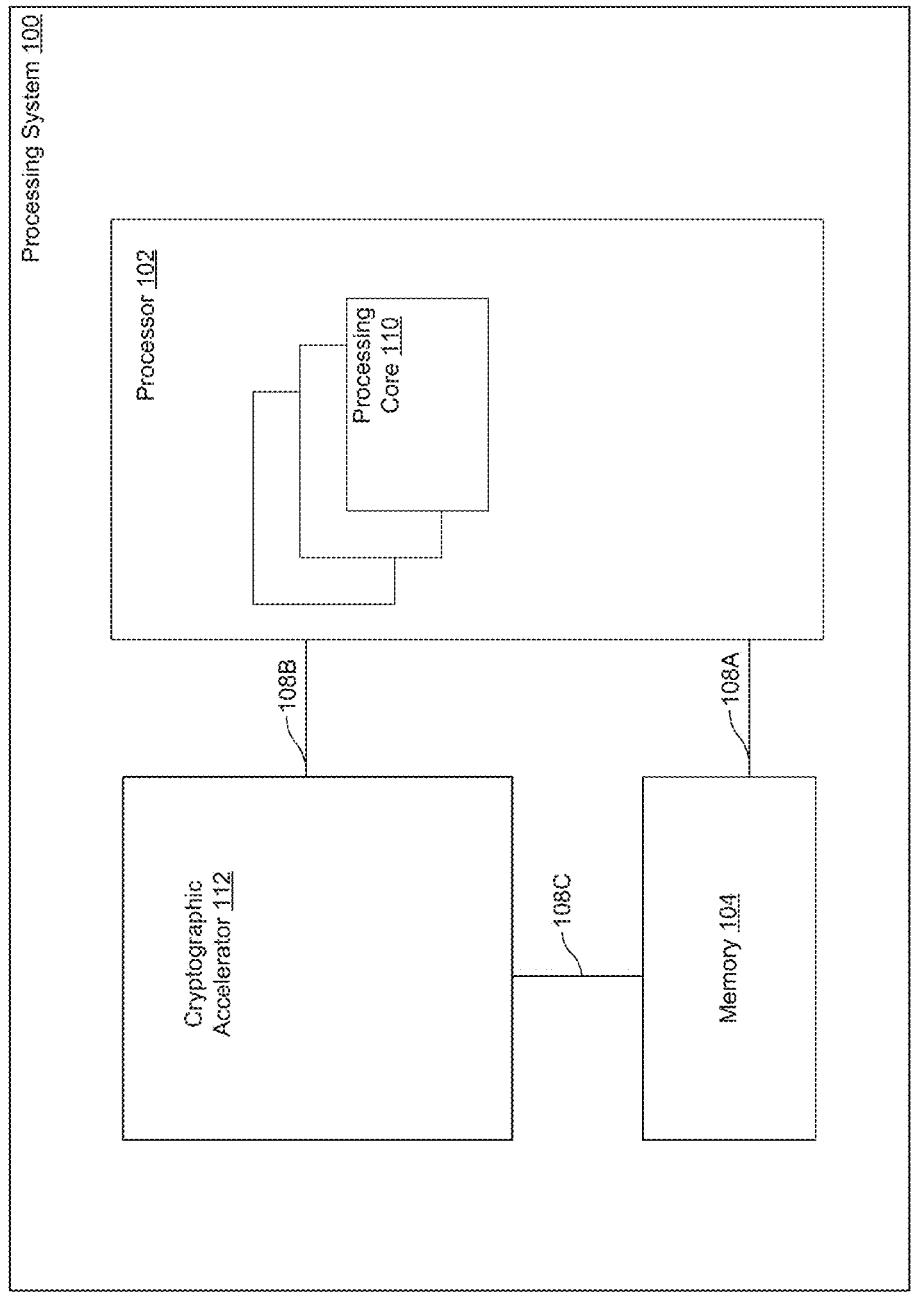
FIG. 1A schematically illustrates a processing system that may be employed to perform cryptographic operations, in accordance with one or more aspects of the present disclosure.

"Cryptographic operation" herein shall refer to a data processing operation involving secret parameters (e.g., encryption/decryption operations using secret keys). "Cryptographic data processing system" herein shall refer to a data processing system (e.g., a general purpose or specialized processor, a system-on-a-chip, or the like) that is employed for performing cryptographic operations.

A cryptographic method, such as Advanced Encryption Standard (AES) or SMS4, may perform several iterations (also referred to as "rounds") to transform, using an encryption key, a plaintext data into an encrypted cipher text or vice versa. Each round may include a sequence of arithmetic, logical, or byte permutations operations performed on an input state using a round key which is derived from the encryption key. The resulting state of each but the last round may then be utilized as the input state of the subsequent round.

The computational complexity of mapping such arithmetic, logical, or byte permutation operations onto general-purpose microprocessors, combined with high data rates of real-time media processing and memory encryption may create power and performance bottlenecks within the processor core. Aspects of the present disclosure address this and other deficiencies by disclosing systems (such as hardware accelerators) and methods for performing non-linear data processing operations using composite Galois fields.

In an illustrative example, at each round of a cryptographic operation, certain bits of the round key may be mixed with at least a subset of the round state, and the result may be by a substitution byte module commonly referred to as an S-box. The output of the S-box may be rotated, and subsequently mixed with the round state to create an intermediate output that would repeatedly go through round iterations. Following the final round, four words (or sixteen state bytes) may be used to generate the final cipher output.

In certain implementations, the input and output of the S-box may be represented by elements of a Galois field GF($2^8$), which may be viewed as a set of 256 8-bit integers with certain operations defined on those integers.

In accordance with one or more aspects of the present disclosure, the S-box may be implemented by using a scaling circuit, which splits the S-box operation into two paths. In one embodiment, the first path determines a first output by applying a mapped affine transformation to an input bit sequence represented by an element of a composite field of a finite-prime field, wherein the first output is represented by an element of the composite field of the finite-prime field. A second path may determine a second output by applying a scaled mapped affine transformation to the input bit sequence, wherein the second output is represented by an element of the composite field and is equal to a multiple of the first output in the composite field. In one example, the second output is double the first output. In one embodiment, a mixed columns (MixColumns) operation of a cryptographic round can then add one or more of the first output and the second output, to generate each of the multiple MixColumns outputs without need of multiplication. Transformation of multiplication within the composite field is resource intensive, takes up additional circuit area, and is slower. Additional or different logic and techniques may be employed to produce a high-throughput, area-efficient implementation of a cryptographic accelerator, as will be discussed in detail.

In the following description, numerous specific details are set forth, such as examples of specific types of processors and system configurations, specific hardware structures, specific architectural and micro-architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512-bit, 256-bit, 128-bit, 64-bit, 32-bit, or 16-bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

Referring now to FIG. 1A, shown is a block diagram of an example processing system 100 in accordance with one or more aspects of the present disclosure. As shown in FIG. 1, example processing system 100 may include a processor (such as a central processing unit (CPU)) 102 and a memory 104 that are connected to each other via an interconnect 108A. In certain implementations, processor 102 may include one or more processing cores 110. Processor 102 may execute tasks such as system applications and user applications using memory 104 to store the instructions of the programs and data associated with the programs.

In accordance with one or more aspects of the present disclosure, the processing system 100 may further include a cryptographic hardware accelerator 112 communicatively coupled to the processor 102 via an interconnect 108B. The cryptographic hardware accelerator 112 may be further communicatively coupled to the memory 104 via an interconnect 108C. The structure and operation of cryptographic hardware accelerator 112 are described in more detail herein below.

Figure 1B:
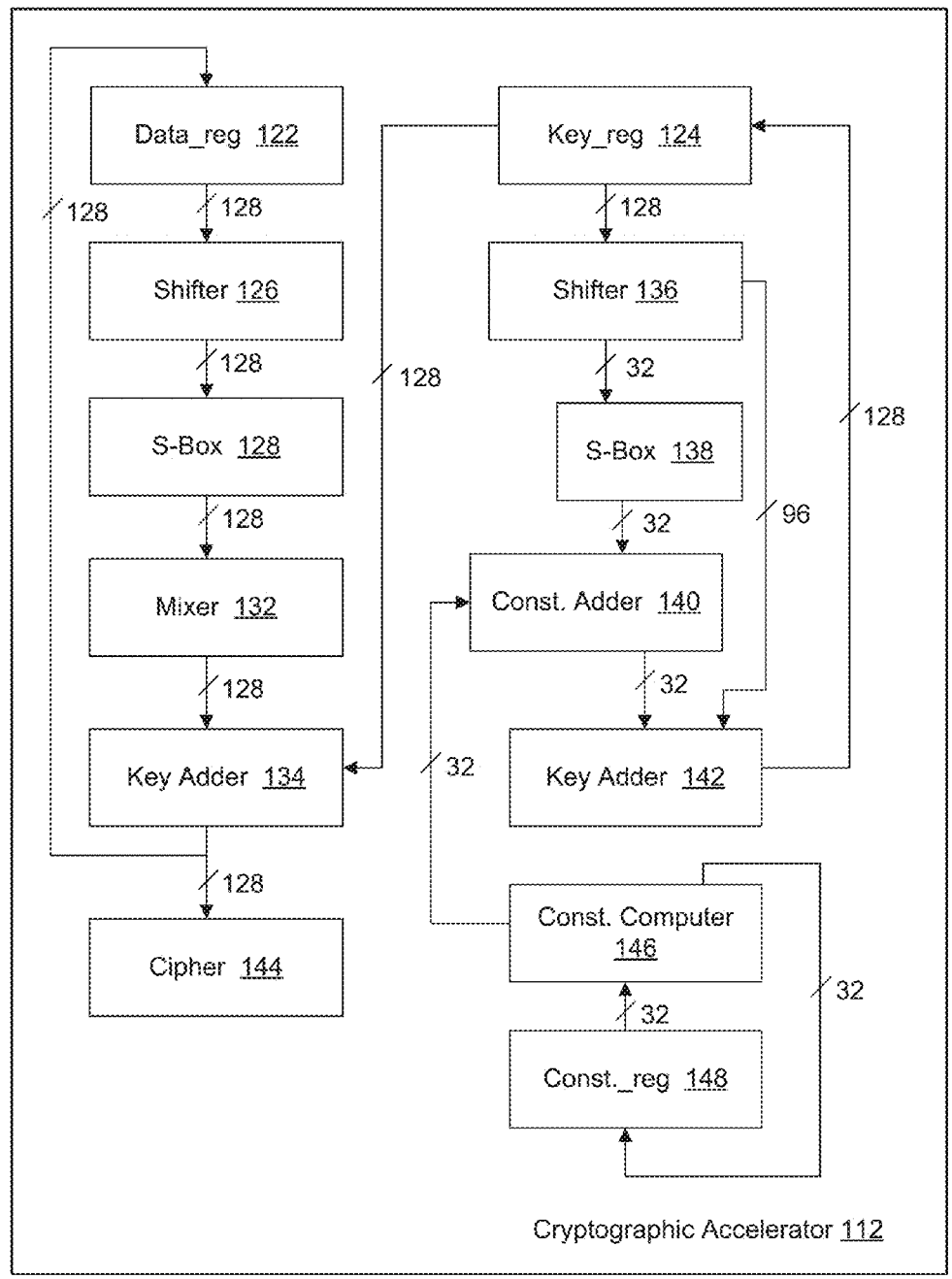
FIG. 1B schematically illustrates a block diagram of a cryptographic hardware accelerator implementing cryptographic operations, in accordance with one or more aspects of the present disclosure.

FIG. 1B schematically illustrates a block diagram of a cryptographic hardware accelerator implementing cryptographic operations, in accordance with one or more aspects of the present disclosure. In certain implementations, the systems and methods described herein may be employed for implementing various cryptographic methods (such as AES or SMS4). For example, in one embodiment FIG. 1B illustrates AES-128, AES-192 or AES-256 accelerator microarchitecture. As will be seen in FIG. 2, AES-256 involves 14 rounds of encryption, each round using a key derived from a base key, although the principles applied herein may be applied to other forms of AES or other types of cryptographic algorithms.

As schematically illustrated by FIG. 1B, cryptographic hardware accelerator 112 may include a series of cryptographic operators to include a data register 122, a shifter 126, an S-Box operator 128, a mixer 132, a key adder 134 and a cipher output 144. The cryptographic accelerator 112 may also include a series of key operators to generate a new key during each round of encryption. In one example, the key operators include a key register 124, a key expander 136, a shifter 136, an S-Box operator 138, a constant adder 140, a key adder 142, a constant computer 146 and a constant register 148. More or different cryptographic operators and key operators may be present in different embodiments.

In one embodiment, input data of the cryptographic hardware accelerator 112 may first be whitened by XOR-ing an input data block with the first 128 bits of an input cipher key. These 128 bits may be referred to as a whitening key. The cryptographic method continues with 10/12/14 rounds, each one using another round key. In each round, the data register 122 passes bytes of data into the shifter 126 that represents a round state of four words. The shifter 126, the S-Box 128, the mixer 132 and the key adder 134 may then perform cryptographic processing on the input state to create a new set of four words that repeatedly go through round iterations. Each iteration uses a new key that is derived from the previous key and by employing a similar set of shifting, S-box, mixing and key adding operations. Following the final round, the four words (or sixteen state bytes) are used to generate the cipher output 144.

More specifically, in one embodiment, the data register 122 stores a plurality of bits of the round state and the key register 124 stores a plurality of bits of the round key. In an illustrative example, the shifter 126 performs a byte-wise permutation to shift rows of incoming data. The shift rows operation may be viewed as an operation on the 4×4 matrix representation of the state. In the illustrative example, the S-Box operator 128 may perform a transformation on the shifted rows version of the incoming state. Using AES as an exemplary type of encryption (or decryption), the transformation may be an 8-bit transformation defined as the affine function $x \rightarrow Ax^{-1}+b$. For example, this transformation may look like:

$$\begin{pmatrix} x7 \\ x6 \\ x5 \\ x4 \\ x3 \\ x2 \\ x1 \\ x0 \end{pmatrix} \rightarrow \begin{pmatrix} 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \\ 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \end{pmatrix} \begin{pmatrix} x7 \\ x6 \\ x5 \\ x4 \\ x3 \\ x2 \\ x1 \\ x0 \end{pmatrix}^{-1} + \begin{pmatrix} 0 \\ 1 \\ 1 \\ 0 \\ 0 \\ 0 \\ 1 \\ 1 \end{pmatrix}$$

The S-Box operator 128 may also be implemented with lookup tables.

In one embodiment, the mixer 132 may then perform a MixColumns transformation on the output of the S-box operator 128. The MixColumns transformation may be a 16-byte transformation operating on the columns of the 4×4 matrix representation of the input state. The MixColumns transformation may treat each column as a third degree polynomial with coefficients, e.g., in an Galois field $GF(2^8)$. For example, each column of the 4×4 matrix representation of the state may be multiplied by polynomial $a(x)=\{03\}x3+\{01\}x2+\{01\}x+\{02\}$ and reduced by modulo $x4+1$. Here, $\{\ \}$ denotes an element in a Galois field $GF(2^8)$. The transformation may be expressed as $[P-A] \rightarrow [P'-A']$ where a carry-less multiplication is followed by a reduction modulo to produce, e.g., A' through P' outputs (depending on number of bits being transformed). The mixer 132 may also be implemented with lookup tables.

Figure 1C:
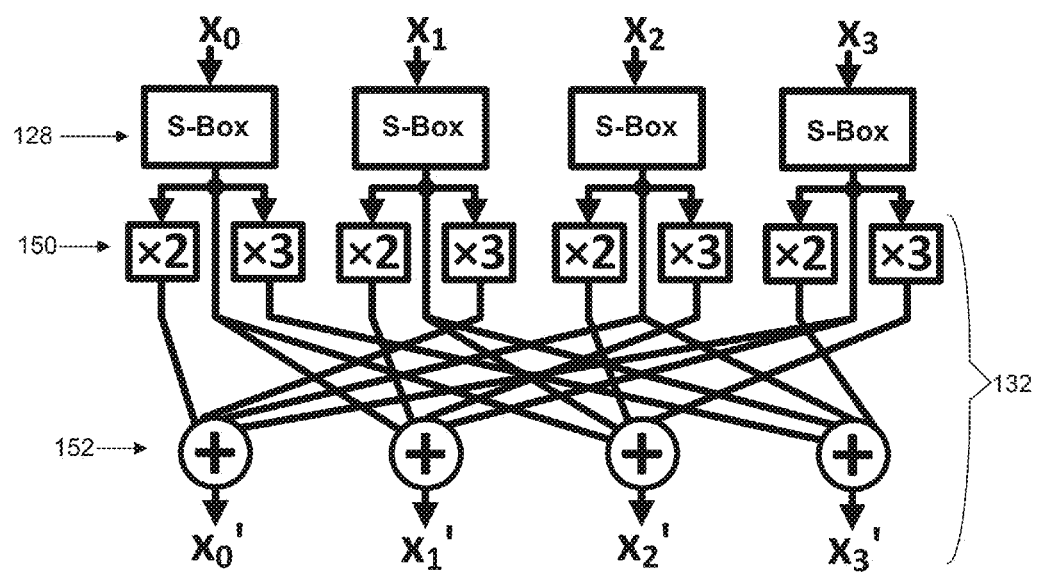
FIG. 1C schematically illustrates data paths of a cryptographic round that may implement substitute byte (S-Box) and mixed columns (MixColumns) operations according to one or more aspects of the present disclosure.

FIG. 1C schematically illustrates data paths of a cryptographic round that may implement the S-box operator 128 and the mixer 132 according to one or more aspects of the present disclosure. In this embodiment, and as just explained, the operation of the S-Box operators 128 result in a need to perform, by the mixer 132, multiplications using multipliers 150 to generate scaled versions of outputs from the S-Box operators 128. Following the multiplications, for example, the mixer 132 produces a doubled scaled output (×2) and a tripled scaled output (×3) in addition to the regular S-Box output. A plurality of summers 152 may then be employed to generate the MixColumns outputs, e.g., ($x'_0$, $x'_1$, $x'_2$, $x'_3$).

With further reference to FIG. 1B, and in one embodiment, the key adder 134 adds a round key during each cryptographic round to the output of the mixer 132. With the series of key operators, the cryptographic accelerator 112 may perform a (128-bit, 128-bit)→128 bit transformation, which is defined as the bit-wise XOR of its two arguments. In the AES flow, for example, these arguments may be the state and the round key combined within the key adder 134.

The key expansion operation for each round may be implemented by the key operator mentioned previously. For example, an input key (e.g., 128-bit input key) from the key register 124 may be shifted by the shifter 136 similarly as discussed with reference to the shifter 126. A first 32 bits of the shifted key may go through the S-Box operator 138 followed by the constant adder 140 adding a 32-bit round constant to a substitute byte output. The reminder 96 bits of the shifted key may be sent directly to be added within the key adder 142 to the output of the constant adder 140. In AES-256, for example, the key expansion operation may involve seven rounds of expansion logic where the constant adder 140 adds seven 32-bit constants to a substitute version of the previous round's key, to generate a key for the next round, which is stored in the key register 124 for use by the key adder 134. Each round constant may be produced by the constant computer 146 using the values stored in a constant register 148.

Figure 2:
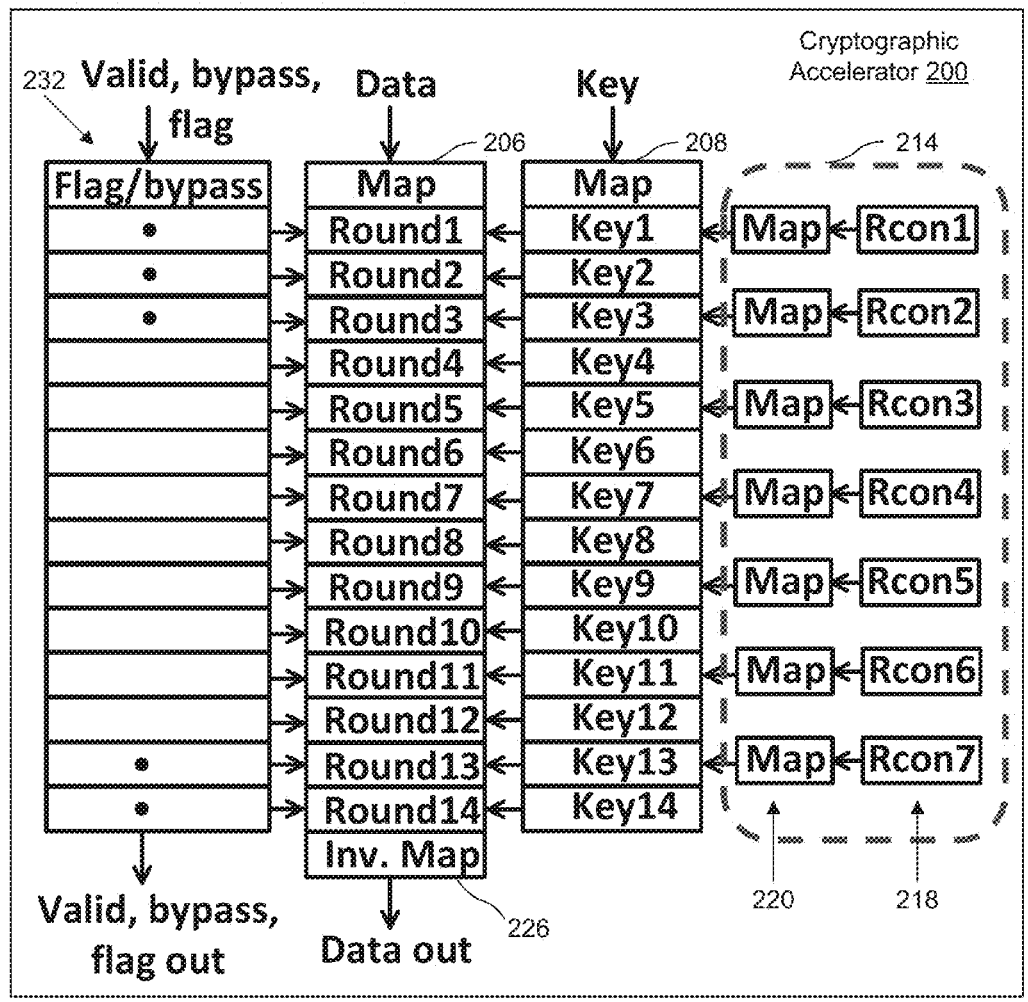
FIG. 2 schematically illustrates a block diagram of a cryptographic hardware accelerator implementing cryptographic operations, in accordance with one or more other aspects of the present disclosure.

FIG. 2 schematically illustrates a block diagram of a cryptographic hardware accelerator 200 implementing cryptographic operations, in accordance with one or more other aspects of the present disclosure. Rounds of encryption, particularly the 14 rounds performed by AES-256, are resource intensive and create a bottleneck in data transfer to and from memory. Data throughput becomes a particular concern in high-speed data transfers such in relation to solid-state drive (SSD) memory. By changing the design of the cryptographic accelerator 200 as shown in FIG. 2, and executing logic with use of composite field arithmetic, the design area may be reduced and efficiencies gained. For example, the design of the cryptographic accelerator 200 may include logic circuitry of each round that is customized for its round-specific constant, and each round may be performed within a composite field with associated transformations. Accordingly, by performing a finite-prime field transformation to the composite field before performing the logic of the rounds of a cryptographic algorithm, and performing an inverse transformation back to the finite-prime field at the end of execution of the rounds, much more arithmetic can be performed in the efficiency-gaining composite field with only the two sets of transformations.

Furthermore, and as will be discussed in more detail with reference to FIGS. 3, 4A, 4B, 5A and 5B, the S-Box logic can be streamlined within the composite field in eliminating look-up tables and performing arithmetic operations that reduce the normally heavy computation requirements in the MixColumns operation.

With further reference to the exemplary embodiment of FIG. 2, both key-expansion and round computation logic are mapped from a finite-prime field, $GF(2^8)$, to a composite field, $GF(2^4)^2$, to perform addition, multiplication, inverse and byte-wise shift operations in the composite field. For example, an input bit sequence of data may be mapped to the composite field by a first mapping transformation 206. An input (or base) key may be mapped to the composite field in a second mapping transformation 208. The result from the final round may be inverse mapped by an inverse mapping transformation 226 to generate a cipher/plain text in the original prime field.

In an illustrative example, the cryptographic input in $GF(2^8)$ is represented as a 2-term polynomial sh*x+sl, where coefficients sh and sl are represented by 4-bit elements of $GF(2^4)$ field. This composite field conversion may be achieved by applying a mapping transformation (M) (such as a mapping matrix) to the inputs, e.g., to both the input bit sequence (in 206) and the input key (in 208). After performing the rounds of the type of encryption or decryption being deployed (such as AES or SMS4), the inverse computation may then be performed in the composite $GF(2^4)^2$ field (in 226), and the result may be mapped back to the finite prime field, $GF(2^8)$, by applying an inverse mapping transformation ($M^{-1}$) such as an inverse mapping matrix. The complexity of round computations and logic overhead for mapping and inverse mapping are governed by choice of reduction polynomials in the composite field, as will be discussed in more detail.

As shown in the design of FIG. 2, logic circuitry of each round of the cryptographic accelerator 200 may be customized for a round-specific constant for that round. Each key expansion round may use a unique, or round-specific, 32-bit constant as defined in the National Institutes of Technology (NIST) standard. In one embodiment, the seven constants are mapped onto the composite field in a round constant transformation 214 to leverage the S-box modifications discussed below, including split S-Box circuitry that eliminates the need for resource-intensive multiplication in the MixColumns operation. (In different embodiments such as with different algorithms, other than seven constants may be used to generate a next round's key.)

More specifically, a round constant is a 32-bit input. So addition of the round constant with the state using a generic adder would require 32 XOR gates. In a conventional implementation, a round's hardware is designed to perform any of the 14 AES round operations. In the present implementation, each round's hardware (e.g., circuit) is customized to the current round and need only compute one of the round-specific constants. For the first round, for example, the round constant may be 32'h01000000. This requires only one XOR gate. Only the $28^{th}$ bit of the input goes through XOR logic, while all the remaining bits can bypass the addition. This saves area (by not having to have 32 XOR gates), and also improves performance by reducing logic depth. This customized dependency of round logic on the round constants can be exploited to opportunistically eliminate logic in the circuits of other rounds as well. The other round constants may be, for example, 32'h02000000 for a second round, 32'h04000000 for a third round, 32'h08000000 for a fourth round, and so forth.

In the round constant transformation 214, individual mapping transformations (M) 220 may be performed on each respective round constant 218, to produce a mapped version of the seven round constants for use in generating each next round's key (depending on the round). These mapped constants, however, can be set as design parameters, and, therefore, no extra hardware may be needed to accomplish field transformation as shown in FIG. 2.

In addition to the cipher/text and key data paths of FIG. 2, the design of the cryptographic accelerator 200 may also incorporate an auxiliary bypass datapath 232, to synchronize tags and control flags to their corresponding plain/cipher text inputs. The "valid, bypass, flag" of FIG. 2 include control flow signals. Valid says that the data being processed in a round is valid data. Sometimes the cryptographic accelerator 200 may need to pass through the data, thus not encrypting the data by bypassing the encryption operations. A flag may be used as an index to identify the data when the data comes out of the engine.

As opposed to a traditional approach where a generic round hardware is used for the entire cryptographic algorithm data-path, the proposed round constant-optimized data path enables opportunistic logic elimination within each round, which provides for significant area saving over existing data-path designs.

Figure 3:
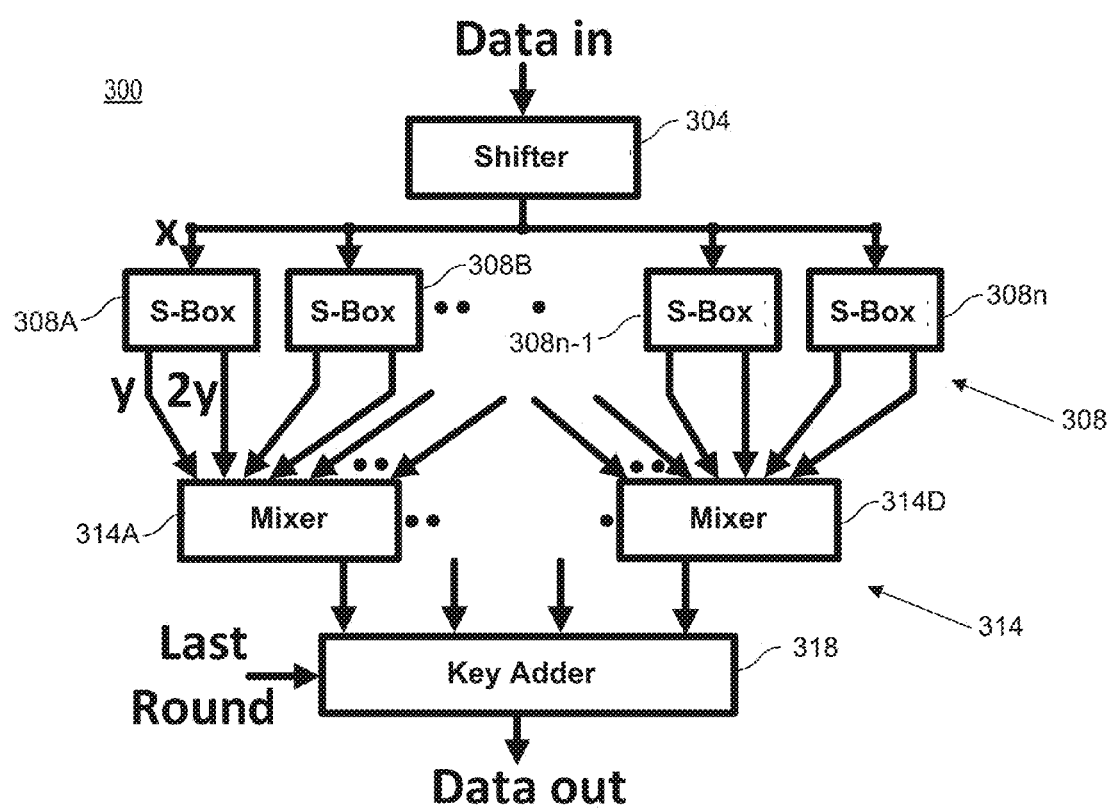
FIG. 3 schematically illustrates data paths of a cryptographic round within a cryptographic hardware accelerator implementing cryptographic operations, in accordance with one or more aspects of the present disclosure.

FIG. 3 schematically illustrates data paths of a cryptographic round within a cryptographic hardware accelerator implementing cryptographic operations, in accordance with one or more aspects of the present disclosure. Continuing with AES as an exemplary cryptographic algorithm, each AES round includes four elementary operations: shift-rows (performed by a shifter 304), substitute-bytes (performed by an S-Box 308), mix-columns (performed by a mixer 314), and add_round_key (performed by a key adder 318). Composite field arithmetic simplifies the inverse operation within the S-Box, reducing overall area. This transformation, however, can potentially complicate mix-columns logic by transforming the scaling factors from simple $GF(2^8)$ representation (01, 01, 02, 03) into complex $GF(2^4)^2$ representation (01, 01, 07, d3).

Furthermore, the serial dependency between S-box and mix-columns operations in a conventional AES data-path can also lead to increased critical path delay owing to the transformed scaling factors. This limits area and power savings of a composite field data path. To mitigate this bottleneck, the cryptographic data path may be altered as shown schematically in FIG. 3, and as explained below. In one embodiment, the shifter 304 performs shift-rows operations as previously discussed, within a composite field. The output of the shift-rows operation goes into an S-Box 308.

The S-Box 308, however, may be implemented with an S-Box scaler circuit to create a series of S-boxes 308A, 308B . . . 308n, where each scaler circuit splits the S-Box circuitry into two data paths to generate two outputs, y and a scaled version of y. In FIG. 3, a specific embodiment indicates that y is generated in a first data path and the scaled version of y is generated in a second data path as 2y, meaning that each S-Box circuitry includes a doubling circuit that outputs twice the output (y) as 2y, although 2y could be any scaled version of y in other embodiments. In this way, the S-Box scaler circuitry breaks serial dependency between the S-Box outputs and the MixColumns operation of the mixer 314 that would normally require multiplication of the S-box outputs, and allows partial pre-computation of scaling factors in the composite field, thus eliminating performance critical multiplication (e.g., scaling) steps from the MixColumns operation.

In one embodiment, the determination of y and 2y may be done in parallel within a composite field of the finite-prime field, where 4-bit circuitry (e.g., split substitute byte circuitry) replaces 8-bit substitute byte circuitry of the finite prime field so that the y and 2y operations, for example, may be performed at the same time. The 4-bit circuitry may perform 4-bit operations such as matrix additions, matrix multiplications, and calculating an inverse matrix, and the like. In the composite field, an 8-bit operation may be performed by performing multiple 4-bit operations and merging them at the end to generate an 8-bit result. Performing split S-Box operations in this way, e.g., in parallel in the composite field, maximizes efficiency of the S-Box 308, while also generating outputs for a more-efficient implementation of the MixColumns operations of the mixer 314.

For example, the mixer 314 may include sub-components 314A through 314D, each of which may receive corresponding S-box outputs y and scaled version of y (such as 2y) as inputs, and add one or more of each S-Box output (y, 2y) to generate a MixColumns output without using multiplication. For example, if a single "y" output is added to a single "2y" output, a scaled output of "3y" is produced without multiplication by adding y and 2y.

The key adder 318 may then perform an add_round_key operation to combine the current round's key with the MixColumns output to generate the sixteen bytes of an intermediate state, which is input back into the iterative rounds until the last round, after which the sixteen bytes are output as the final cipher output 144.

FIG. 4A schematically illustrates transformation logic that may be employed to implement transformation within a substitute byte (S-Box) of FIG. 3 from a finite-prime field $GF(2^8)$ to a composite-field $GF(2^4)^2$, in accordance with one or more aspects of the present disclosure. The S-Boxes 308 of FIG. 3 operate in the composite field using a new set of mapped affine transformations, e.g., (A", b") in addition to (A', b'). Both affine transformations operate in parallel, and hence generate the scaled output (e.g., 2y in one embodiment) without incurring any extra delay in the S-Box critical paths.

FIG. 4A schematically illustrates the arithmetic to derive the new mapped affine transforms. The scaling matrix "T" in $GF(2^8)$ shown in FIG. 4A is used in conjunction with the affine transformation (A, b) and the mapping matrix (M) to generate the new scaled mapped affine transformation (A") along-with a standard mapped affine transformation (A'). For example, the affine transformation A' may be determined (and possibly pre-calculated) as $M \cdot A \cdot M^{-1}$ where M and $M^{-1}$ is each an 8×8 matrix and A is an 8×1 vector. The affine transform b' may be determined (and possibly pre-calculated) as $M \cdot b$, where M is an 8×8 matrix and b is an 8×1 vector of constants. Furthermore, the scaled affine transformation A" may be determined (and possibly pre-calculated) as $M \cdot T \cdot A \cdot M^{-1}$ where the scaling matrix, T, is now added between the mapping matrix M and the affine transformation, A. The scaling matrix, T, may also be an 8×8 matrix. The scaled affine transformation b' may similarly be determined (and possibly pre-calculated) as $M \cdot T \cdot b$, where b is an 8×1 vector of constants. In one example, the scaling matrix is a doubling matrix to produce a doubled output, such as 2y.

FIG. 4B schematically illustrates logic that may be employed to implement MixColumns calculations from the outputs of the S-Box of FIG. 3, in accordance with one or more aspects of the present disclosure. As can be seen, for example, $x'_0$ may be generated by adding $2x_1$ and $x_1$ (among other S-Box outputs), which now can be done in the composite field as $2x_1 + x_1 = 3x_1$. In this way, multiplication normally required in the MixColumns operation may be eliminated in favor of addition operations by summers (FIG. 5).

Figure 5:
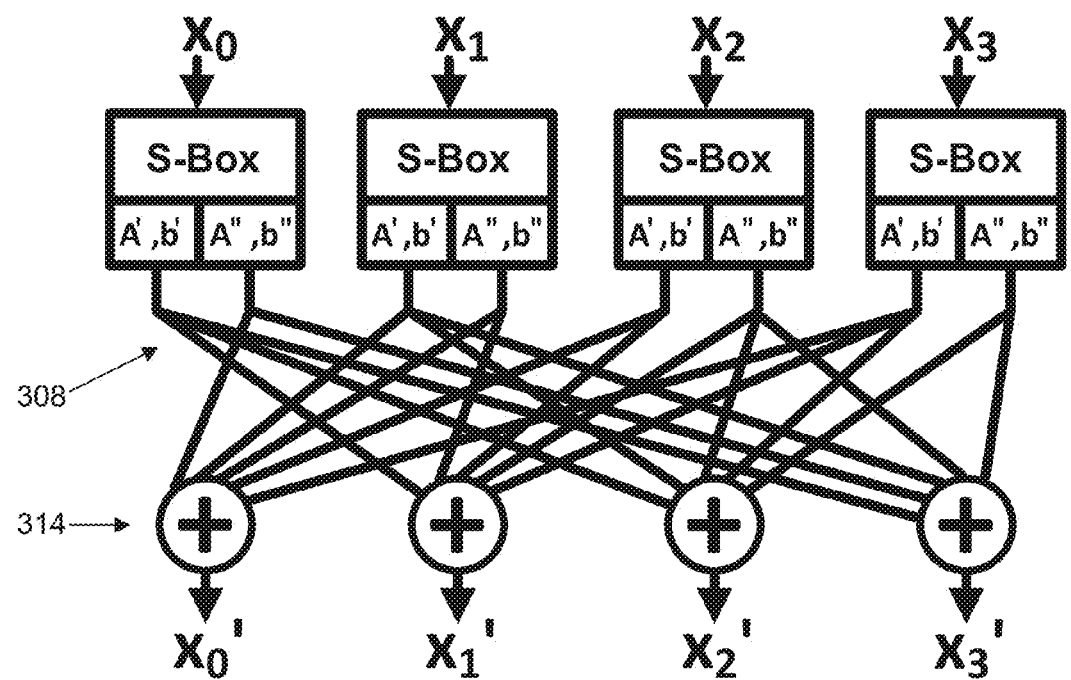
FIG. 5 schematically illustrates data paths data paths of a cryptographic round that may implement S-box and MixColumns operations according to other one or more aspects of the present disclosure.

FIG. 5 schematically illustrates data paths of a cryptographic round that may implement S-Box and MixColumns operations according to one or more aspects of the present disclosure. FIG. 5 shows a more-detailed version of the S-Box operators 308 of FIG. 3, which produce the affine scaled outputs (A', b') and (A", b"). The mixer 314, which may include a plurality of summers 314, may then perform a MixColumns operation (now only addition operations) to produce the MixColumns outputs, e.g., ($x'_0$, $x'_1$, $x'_2$, $x'_3$), thus eliminating performance critical multiplication (e.g., scaling) steps from the MixColumns operation.

In sum, the simplification of MixColumns logic with S-box affine scaling may eliminate multiplication from the critical path by adding scaled outputs from the streamlined S-box design with the MixColumns logic (explained earlier), thus significantly improving maximum operating encryption frequency. The S-Box affine scaling technique as explained herein applies to both an encryption data pathway and a decryption data pathway. During decryption, scaled inverse affine transforms (2×, 4× and 8×) can be used to eliminate multiplication operation from the inverse MixColumns operation and accelerate round computation.

Implementing the S-box hardware accelerator in accordance with one or more aspects of the present disclosure may involve identifying finite-prime field and composite-field polynomials producing the optimal hardware accelerator area. Though AES operations in the prime field are governed by the Rijndael reduction polynomial as specified in the NIST standard, those in the composite field are governed by the reduction polynomials that can be selected at will by the designer. An exploration framework may be implemented to exhaustively evaluate all 2,880 possible AES data paths with their unique map, inverse-map and scaled affine transformations. Choice of $x^4 + x^3 + 1$ and $x^2+4x+2$ as the reduction polynomials (respectively finite-prime field and composite field) lead to the best area optimal encryption design. The optimal design is nearly 10% smaller than the conventional implementation. A similar exploration of the decryption data path shows that the polynomial pair $x^4+x^3+1$ and $x^2+4x+6$ provides the smallest area (more than 10% lower area than the average area of all designs).

Figure 6:
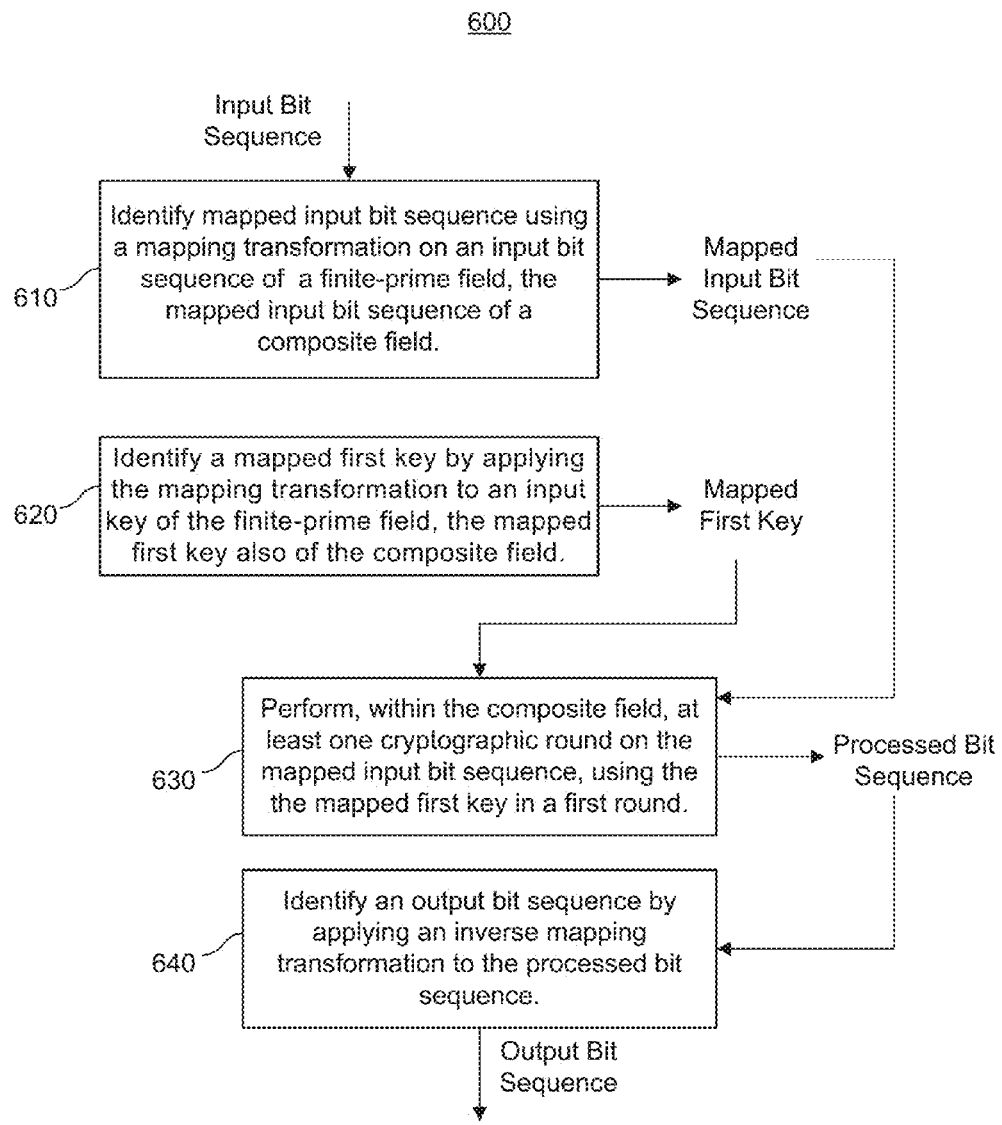
FIG. 6 depicts a flow diagram of an example method of performing an affine transformation before and after performing encryption round(s), according to one or more aspects of the present disclosure.

FIG. 6 depicts a flow diagram of an example method 600 of performing an affine transformation before and after performing encryption round(s), according to one or more aspects of the present disclosure. The method 600 may be performed by a cryptographic accelerator that may perform various mapping transformations between a finite-prime field, $GF(2^8)$, and a composite field, $GF(2^4)^2$, of the finite-prime field, with an exemplary implementation illustrated in FIG. 2.

Accordingly, the method 600 may be performed by a processing system that may comprise hardware (e.g., circuitry, dedicated logic, and/or programmable logic), software (e.g., instructions executable on a computer system to perform hardware simulation), or a combination thereof. In an illustrative example, the method 600 may be performed by processing system 100 of FIG. 1. The method 600 and/or each of its functions, routines, subroutines, or operations may be performed by one or more processors of a computer system executing the method. Two or more functions, routines, subroutines, or operations of the method 600 may be performed in parallel or in an order which may differ from the order described above.

Referring to FIG. 6, the method 600 may start where the processing system implementing the method may identify a mapped input bit sequence by applying a mapping transformation to an input bit sequence represented by a first element of a finite-prime field, wherein the mapped input bit sequence is represented by a first element of a composite field of the finite-prime field (610). The method may continue where the processing system implementing the method may identify a mapped first key by applying the mapping transformation to an input key represented by a second element of a finite-prime field, wherein the mapped first key is represented by a second element of a composite field of the finite-prime field (620). The method may continue where the processing system implementing the method may perform, within the composite field, at least one cryptographic round on the mapped input bit sequence, using the mapped first key during a first round of the at least one cryptographic round, to generate a processed bit sequence (630). In one embodiment, several rounds of encryption or decryption are performed to generate the processed bit sequence. The method may continue where the processing system implementing the method may identify an output bit sequence to be stored back in the finite-prime field by applying an inverse mapping transformation to the processed bit sequence after the final round of encryption or decryption (640).

Figure 7:
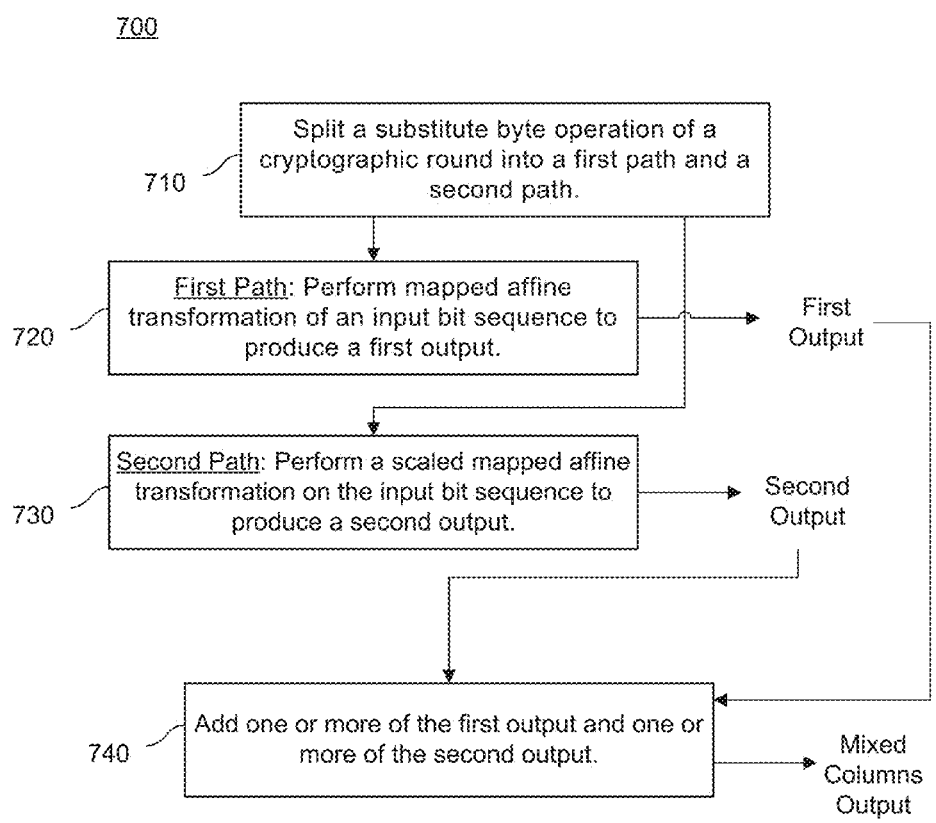
FIG. 7 depicts a flow diagram of an example method of performing a split S-Box operation over two paths to generate first and second scaled outputs.

FIG. 7 depicts a flow diagram of an example method 700 of performing a split S-Box operation over two paths to generate first and second scaled outputs. The method 700 may be executed by a substitute byte (S-Box) operator and a mixer that performs a MixColumns operation, e.g., as is performed during AES cryptography. The method 600 may be performed by a cryptographic accelerator that may perform various mapping transformations between a finite-prime field, $GF(2^8)$, and a composite field, $GF(2^4)^2$, of the finite-prime field, with an exemplary implementation illustrated in FIG. 3.

Accordingly, the method 700 may be performed by a processing system that may comprise hardware (e.g., circuitry, dedicated logic, and/or programmable logic), software (e.g., instructions executable on a computer system to perform hardware simulation), or a combination thereof. In an illustrative example, the method 700 may be performed by processing system 100 of FIG. 1. The method 700 and/or each of its functions, routines, subroutines, or operations may be performed by one or more processors of a computer system executing the method. Two or more functions, routines, subroutines, or operations of the method 700 may be performed in parallel or in an order which may differ from the order described above.

Referring to FIG. 7, the method 700 may start where the processing system implementing the method may split a substitute byte (S-Box) operation of a cryptographic round into a first path and a second path (710). The method 700 may continue where the processing system implementing the method may perform a mapped affine transformation of an input bit sequence to produce a first output, wherein the input bit sequence is represented by an element of a composite field a finite-prime field and the first output is represented by a first element of the composite field of the finite-prime field (720). The method 700 may continue where the processing system implementing the method may perform a scaled mapped affine transformation of the input bit sequence to produce a second output that is equal to a multiple of the first output in the composite field, wherein the second output is represented by a second element of the composite field of the finite-prime field (730). The method 700 may continue where the processing system implementing the method may add one or more of the first output and one or more of the second output, to generate a mixed columns output without use of multiplication (740).

Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 8:
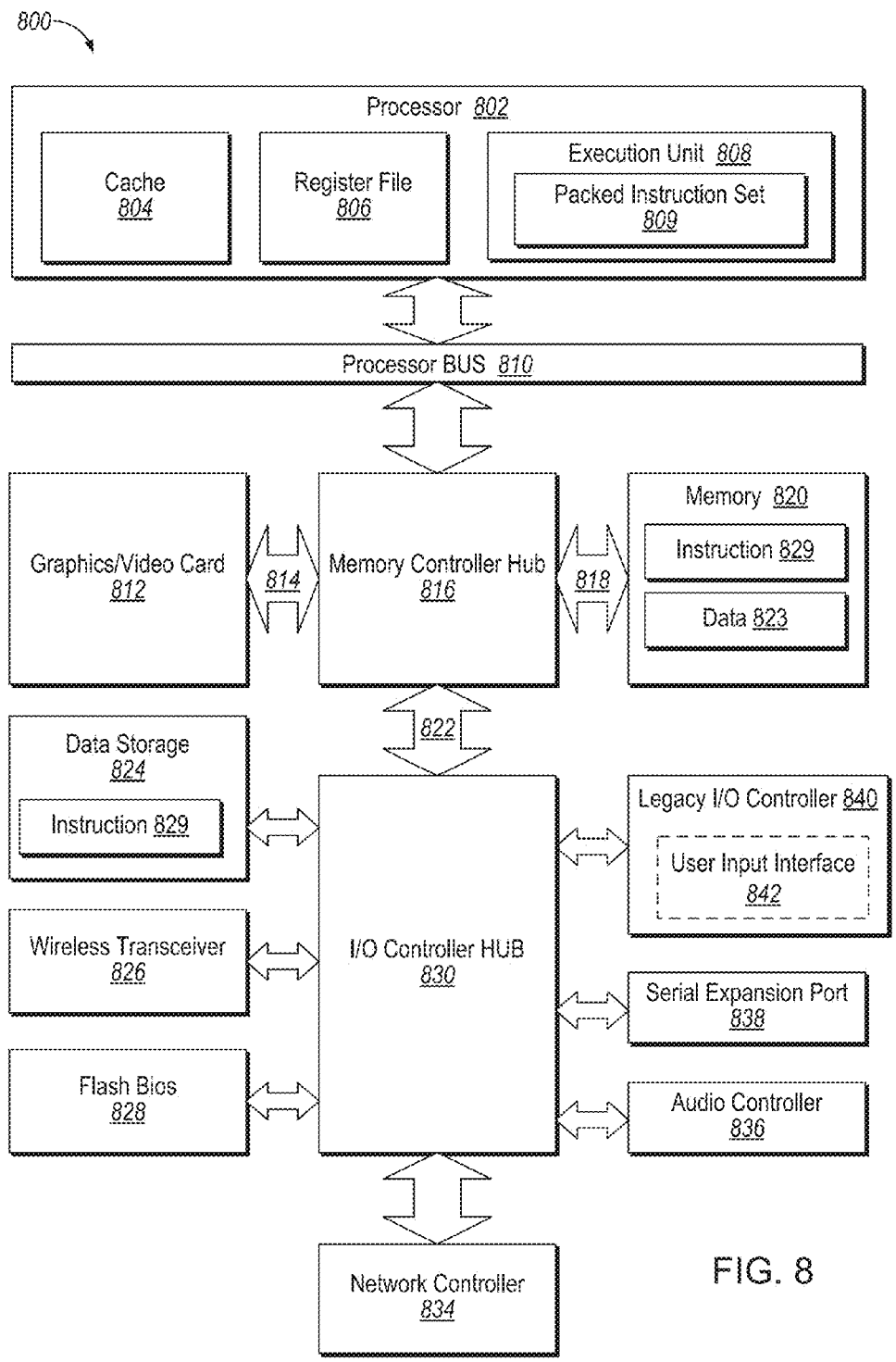
FIG. 8 depicts a high-level component diagram of an example computer system, in accordance with one or more aspects of the present disclosure.

FIG. 8 depicts a high-level component diagram of one example of a computer system in accordance with one or more aspects of the present disclosure. A computer system 800 may include a processor 802 to employ execution units including logic to perform algorithms for processing data, in accordance with the embodiment described herein. System 800 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In certain implementations, sample system 800 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

In an illustrative example, processor 802 includes one or more execution units 808 to implement an algorithm that is to perform at least one instruction. One embodiment may be described in the context of a single processor desktop or server system, but alternative embodiments may be included in a multiprocessor system. System 800 is an example of a 'hub' system architecture. The computer system 800 includes a processor 802 to process data signals. The processor 802, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 802 is coupled to a processor bus 810 that transmits data signals between the processor 802 and other components in the system 800. The elements of system 800 (e.g. graphics accelerator 812, memory controller hub 816, memory 820, I/O controller hub 824, wireless transceiver 826, Flash BIOS 828, Network controller 834, Audio controller 836, Serial expansion port 838, I/O controller 840, etc.) perform their conventional functions that are well known to those familiar with the art.

In certain implementations, the processor 802 includes a Level 1 (L1) internal cache. Depending on the architecture, the processor 802 may have a single internal cache or multiple levels of internal caches. Other embodiments include a combination of both internal and external caches depending on the particular implementation and needs. Register file 806 is to store different types of data in various registers including integer registers, floating point registers, vector registers, banked registers, shadow registers, checkpoint registers, status registers, and instruction pointer register.

Execution unit 808, including logic to perform integer and floating point operations, also resides in the processor 802. The processor 802, in certain implementations, includes a microcode (µcode) ROM to store microcode, which when executed, is to perform algorithms for certain macroinstructions or handle complex scenarios. Here, microcode is potentially updateable to handle logic bugs/fixes for processor 802. For one embodiment, execution unit 808 includes logic to handle a packed instruction set 809. By including the packed instruction set 809 in the instruction set of a general-purpose processor 802, along with associated circuitry to execute the instructions, the operations used by many multimedia applications may be performed using packed data in a general-purpose processor 802. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 808 may also be used in micro controllers, embedded processors, graphics devices, DSPs, and other types of logic circuits. In certain implementations, the processor 802 may further include a cache control logic, the functioning of which is described in more details herein below.

System 800 includes a memory 820. Memory 820 includes a dynamic random access memory (DRAM) device, a static random access memory (SRAM) device, flash memory device, or other memory device. Memory 820 stores instructions 829 and/or data 823 represented by data signals that are to be executed by the processor 802. In certain implementations, instructions 829 may include instructions employing the cache control logic for managing shared cache, as described in more details herein below.

A system logic chip 816 is coupled to the processor bus 810 and memory 820. The system logic chip 816 in the illustrated embodiment is a memory controller hub (MCH). The processor 802 can communicate to the MCH 816 via a processor bus 810. The MCH 816 provides a high bandwidth memory path 818 to memory 820 for instruction and data storage and for storage of graphics commands, data and textures. The MCH 816 is to direct data signals between the processor 802, memory 820, and other components in the system 800 and to bridge the data signals between processor bus 810, memory 820, and system I/O 822. In some embodiments, the system logic chip 816 can provide a graphics port for coupling to a graphics controller 812. The MCH 816 is coupled to memory 820 through a memory interface 818. The graphics card 812 is coupled to the MCH 816 through an Accelerated Graphics Port (AGP) interconnect 814.

System 800 uses a proprietary hub interface bus 822 to couple the MCH 816 to the I/O controller hub (ICH) 830. The ICH 830 provides direct connections to some I/O devices via a local I/O bus. The local I/O bus is a high-speed I/O bus for connecting peripherals to the memory 820, chipset, and processor 802. Some examples are the audio controller, firmware hub (flash BIOS) 828, wireless transceiver 826, data storage 824, legacy I/O controller containing user input and keyboard interfaces, a serial expansion port such as Universal Serial Bus (USB), and a network controller 834. The data storage device 824 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 9:
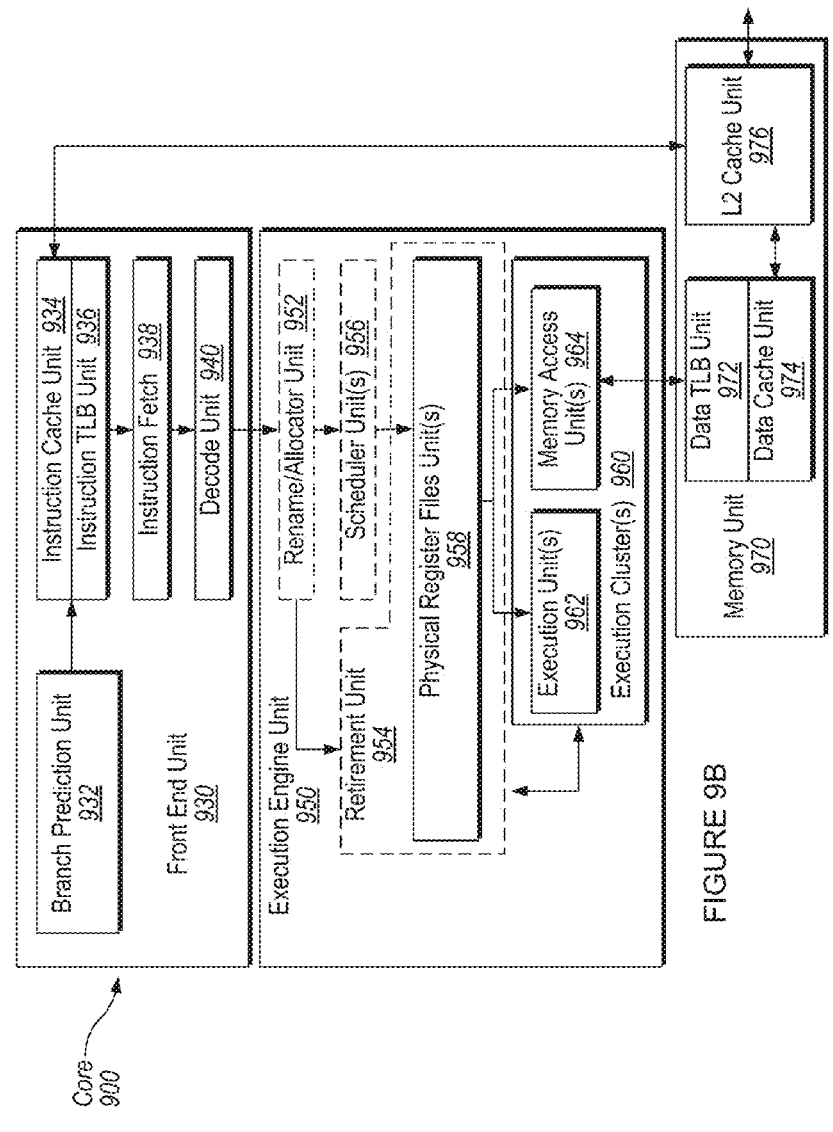
FIGS. 9A-9B schematically illustrate elements of a processor micro-architecture, in accordance with one or more aspects of the present disclosure.

FIGS. 9A-9B schematically illustrate elements of a processor micro-architecture, in accordance with one or more aspects of the present disclosure. In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

In FIG. 9B, arrows denote a coupling between two or more units and the direction of the arrow indicates a direction of data flow between those units. FIG. 9B shows processor core 900 including a front end unit 930 coupled to an execution engine unit 950, and both are coupled to a memory unit 970.

The core 900 may be a reduced instruction set computing (RISC) core, a complex instruction set computing (CISC) core, a very long instruction word (VLIW) core, or a hybrid or alternative core type. As yet another option, the core 900 may be a special-purpose core, such as, for example, a network or communication core, compression engine, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 934 is further coupled to a level 2 (L2) cache unit 976 in the memory unit 970. The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 958 is overlapped by the retirement unit 954 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 954 and the physical register file(s) unit(s) 958 are coupled to the execution cluster(s) 960. The execution cluster(s) 960 includes a set of one or more execution units 162 and a set of one or more memory access units 964.

The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The L2 cache unit 976 is coupled to one or more other levels of cache and eventually to a main memory.

By way of example, the exemplary register aliasing, out-of-order issue/execution core architecture may implement the pipeline 900 as follows: the instruction fetch 938 performs the fetch and length decoding stages 902 and 904; the decode unit 940 performs the decode stage 906; the rename/allocator unit 952 performs the allocation stage 908 and renaming stage 910; the scheduler unit(s) 956 performs the schedule stage 912; the physical register file(s) unit(s) 958 and the memory unit 970 perform the register read/memory read stage 914; the execution cluster 960 perform the execute stage 916; the memory unit 970 and the physical register file(s) unit(s) 958 perform the write back/memory write stage 918; various units may be involved in the exception handling stage 922; and the retirement unit 954 and the physical register file(s) unit(s) 958 perform the commit stage 924.

The core 900 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 900 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 10:
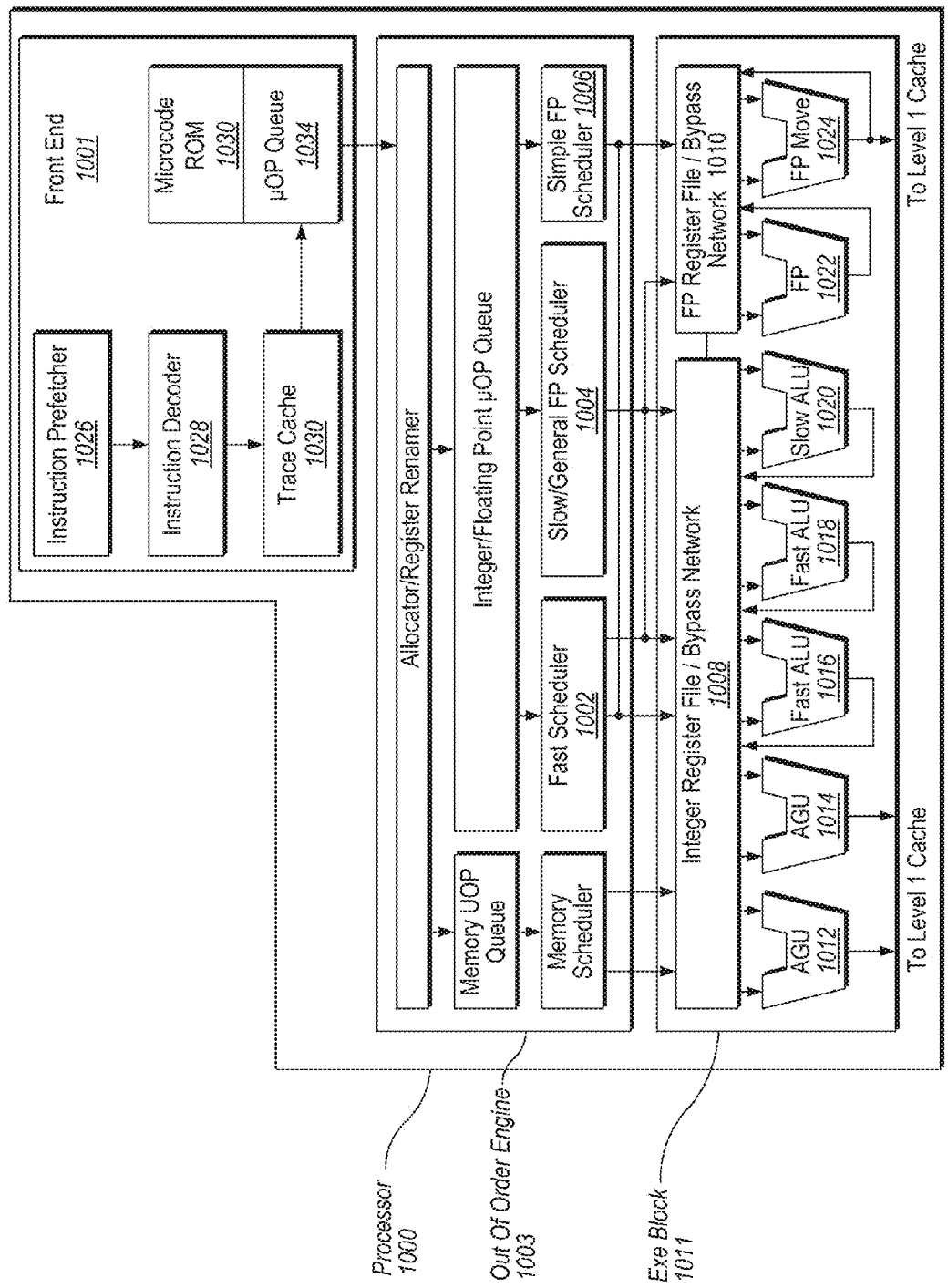
FIG. 10 depicts a block diagram of a processor, in accordance with one or more aspects of the present disclosure.

FIG. 10 is a block diagram of the micro-architecture for a processor 1000 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In certain implementations the in-order front end 1001 is the part of the processor 1000 that fetches instructions to be executed and prepares them to be used later in the processor pipeline. The front end 1001 may include several units. In certain implementations, the instruction prefetcher 1026 fetches instructions from memory and feeds them to an instruction decoder 1028 which in turn decodes or interprets them. For example, in certain implementations, the decoder decodes a received instruction into one or more operations called "micro-instructions" or "micro-operations" (also referred to as µops) that the machine can execute. In other embodiments, the decoder parses the instruction into an opcode and corresponding data and control fields that are used by the micro-architecture to perform operations in accordance with one embodiment. In certain implementations, the trace cache 1030 takes decoded µops and assembles them into program ordered sequences or traces in the µop queue 1034 for execution. When the trace cache 1030 encounters a complex instruction, the microcode ROM 1032 provides the µops needed to complete the operation.

Some instructions are converted into a single micro-op, whereas others need several micro-ops to complete the full operation. In certain implementations, if more than four micro-ops are needed to complete an instruction, the decoder 1028 accesses the microcode ROM 1032 to do the instruction. For one embodiment, an instruction can be decoded into a small number of micro ops for processing at the instruction decoder 1028. In another embodiment, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each µop needs in order to execute. The register aliasing logic maps logical registers onto entries in a register file. The allocator also allocates an entry for each µop in one of the two µop queues, one for memory operations and one for non-memory operations, in front of the instruction schedulers: memory scheduler, fast scheduler 1002, slow/general floating point scheduler 1004, and simple floating point scheduler 1006. The µop schedulers 1002, 1004, 1006 determine when a µop is ready to execute based on the readiness of their dependent input register operand sources and the availability of the execution resources the µops need to complete their operation. The fast scheduler 1002 of one embodiment can schedule on each half of the main clock cycle while the other schedulers can schedule once per main processor clock cycle. The schedulers arbitrate for the dispatch ports to schedule µops for execution.

Physical register files 1008, 1010 sit between the schedulers 1002, 1004, 1006, and the execution units 1012, 1014, 1016, 1018, 1020, 1022, 1024 in the execution block 1011. There is a separate register file 1008, 1010 for integer and floating point operations, respectively. Each register file 1008, 1010, of one embodiment also includes a bypass network that can bypass or forward just completed results that have not yet been written into the register file to new dependent µops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of one embodiment is comprised of a number of execution units: address generation unit (AGU) 1012, AGU 1014, fast ALU 1016, fast ALU 1018, slow ALU 1020, floating point ALU 1022, floating point move unit 1024. For one embodiment, the floating point execution blocks 1022, 1024, execute floating point, MMX, SIMD, and SSE, or other operations. The floating point ALU 1022 of one embodiment includes a 64 bit by 64 bit floating point divider to execute divide, square root, and remainder micro-ops. For systems and methods described herein, instructions involving a floating point value may be handled with the floating point hardware. In certain implementations, the ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one embodiment, the integer ALUs 1016, 1018, 1020 are described in the context of performing integer operations on 64 bit data operands. In alternative embodiments, the ALUs 1016, 1018, 1020 can be implemented to support a variety of data bits including 16, 32, 128, 256, etc. Similarly, the floating point units 1022, 1024 can be implemented to support a range of operands having bits of various widths. For one embodiment, the floating point units 1022, 1024 can operate on 128 bits wide packed data operands in conjunction with SIMD and multimedia instructions.

In certain implementations, the µops schedulers 1002, 1004, 1006 dispatch dependent operations before the parent load has finished executing. As µops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In certain implementations, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In certain implementations, in storing packed data and integer data, the registers do not need to differentiate between the two data types. In certain implementations, integer and floating point are either contained in the same register file or different register files. Furthermore, in certain implementations, floating point and integer data may be stored in different registers or the same registers.

Figure 11:
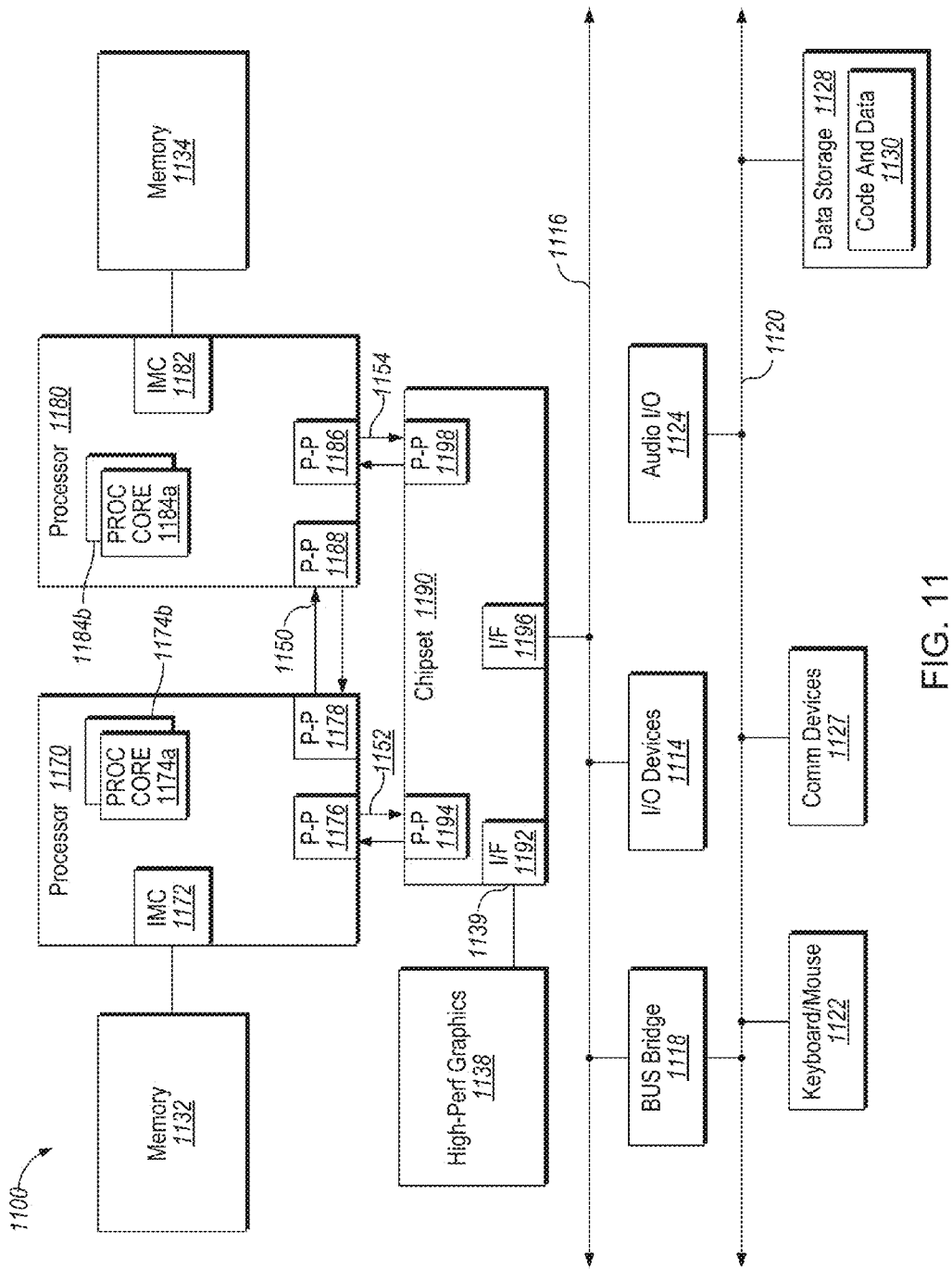
FIG. 11 depicts a block diagram of an example computer system, in accordance with one or more aspects of the present disclosure.

FIG. 11 depicts a block diagram of an example computer system, in accordance with one or more aspects of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of processing system 100 capable of performing memory protection for implementing trusted execution environment, as described in more details herein above. While shown with only two processors 1170, 1180, it is to be understood that the scope of the present disclosure is not so limited. In other embodiments, one or more additional processors may be present in the example computer system.

Figure 13:
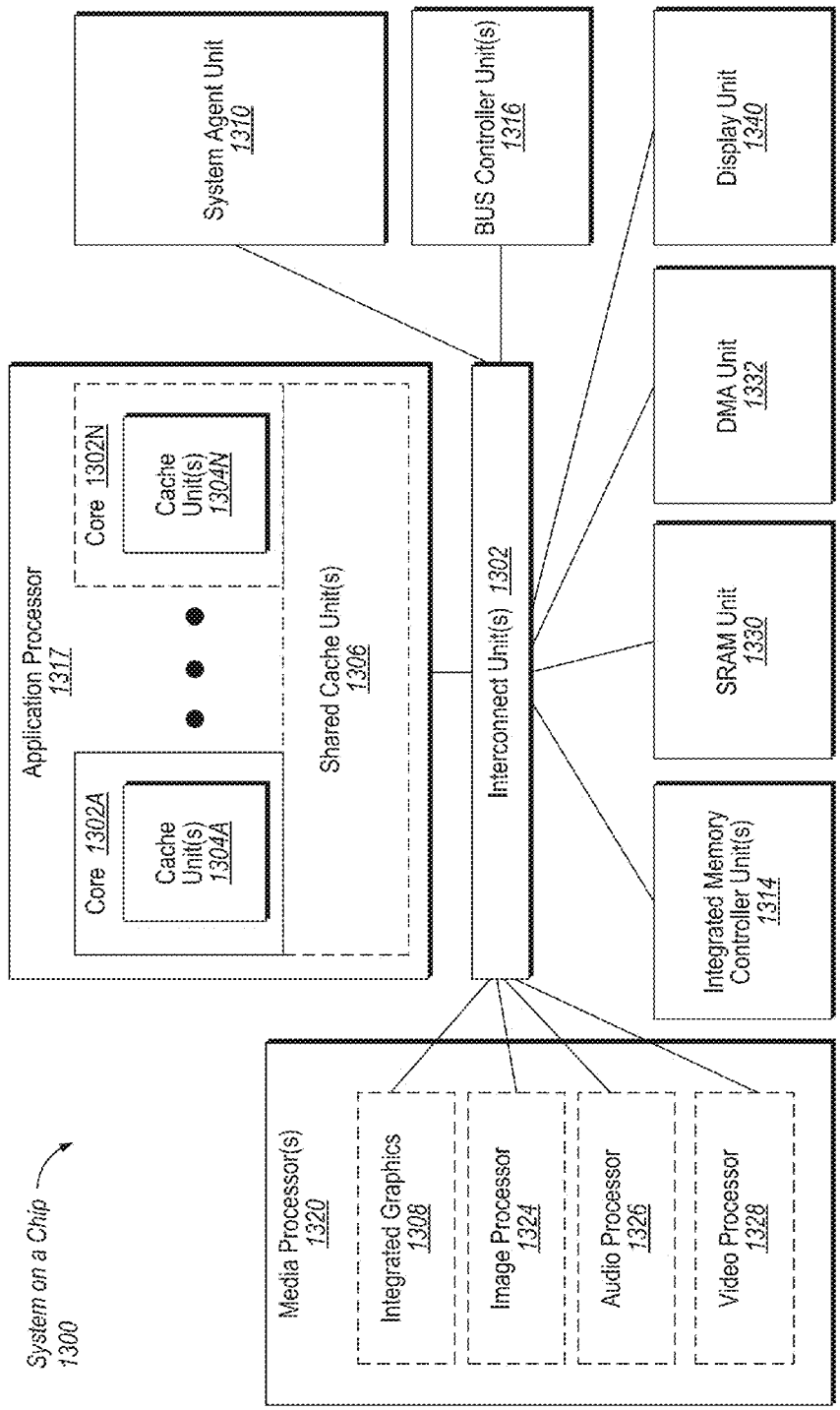
FIG. 13 depicts a block diagram of a system-on-a-chip (SoC) according to one implementation.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 13, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In certain implementations, first bus 1116 may be a Peripheral Component Interconnect (PCI) bus, or a bus such as a PCI Express bus or another third generation 110 interconnect bus, although the scope of the present disclosure is not so limited.

As shown in FIG. 11, various 110 devices 1114 may be coupled to first bus 1116, along with a bus bridge 1118 which couples first bus 1116 to a second bus 1120. In certain implementations, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in certain implementations. Further, an audio I/O 1124 may be coupled to second bus 1120. Note that other architectures are possible. For example, instead of the point-to-point architecture of FIG. 11, a system can implement a multi-drop bus or other such architecture.

Figure 12:
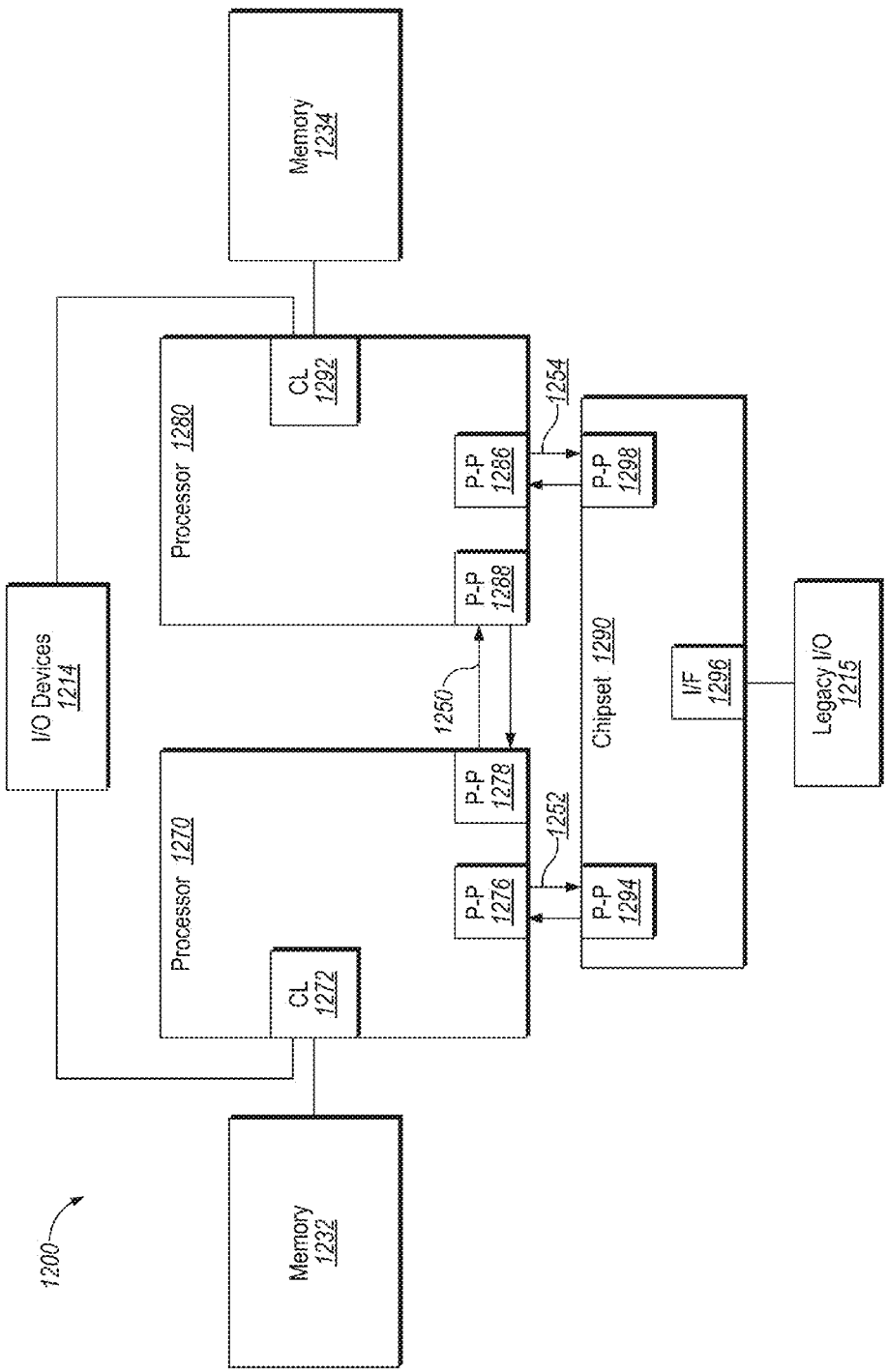
FIG. 12 depicts a block diagram of a multi-processor system according to another implementation.

Referring now to FIG. 12, shown is a block diagram of a third system 1200 in accordance with an embodiment of the present disclosure. Like elements in FIGS. 11 and 12 bear like reference numerals, and certain aspects of FIG. 11 have been omitted from FIG. 11 in order to avoid obscuring other aspects of FIG. 12.

FIG. 12 illustrates that the processors 1270, 1280 can include integrated memory and I/O control logic ("CL") 1272 and 1282, respectively. For at least one embodiment, the CL 1272, 1282 can include integrated memory controller units such as described herein. In addition. CL 1272, 1282 can also include I/O control logic. FIG. 12 illustrates that the memories 1232, 1234 are coupled to the CL 1272, 1282, and that I/O devices 1214 are also coupled to the control logic 1272, 1282. Legacy I/O devices 1215 are coupled to the chipset 1290. The embodiments of the page additions and content copying can be implemented in processor 1270, processor 1280, or both.

FIG. 13 is an exemplary system on a chip (SoC) 1300 that can include one or more of the cores 1302. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

With further reference to the SOC 1300, dashed lined boxes are features on more advanced SoCs. In FIG. 13 an interconnect unit(s) 1302 is coupled to: an application processor 1317 which includes a set of one or more cores 1302A-N and shared cache unit(s) 1306; a system agent unit 1310; a bus controller unit(s) 1316; an integrated memory controller unit(s) 1314; a set of one or more media processors 1320 which can include integrated graphics logic 1308, an image processor 1324 for providing still and/or video camera functionality, an audio processor 1326 for providing hardware audio acceleration, and a video processor 1328 for providing video encode/decode acceleration; a static random access memory (SRAM) unit 1330; a direct memory access (DMA) unit 1332; and a display unit 1340 for coupling to one or more external displays. The embodiments of the pages additions and content copying can be implemented in SoC 1300.

Figure 14:
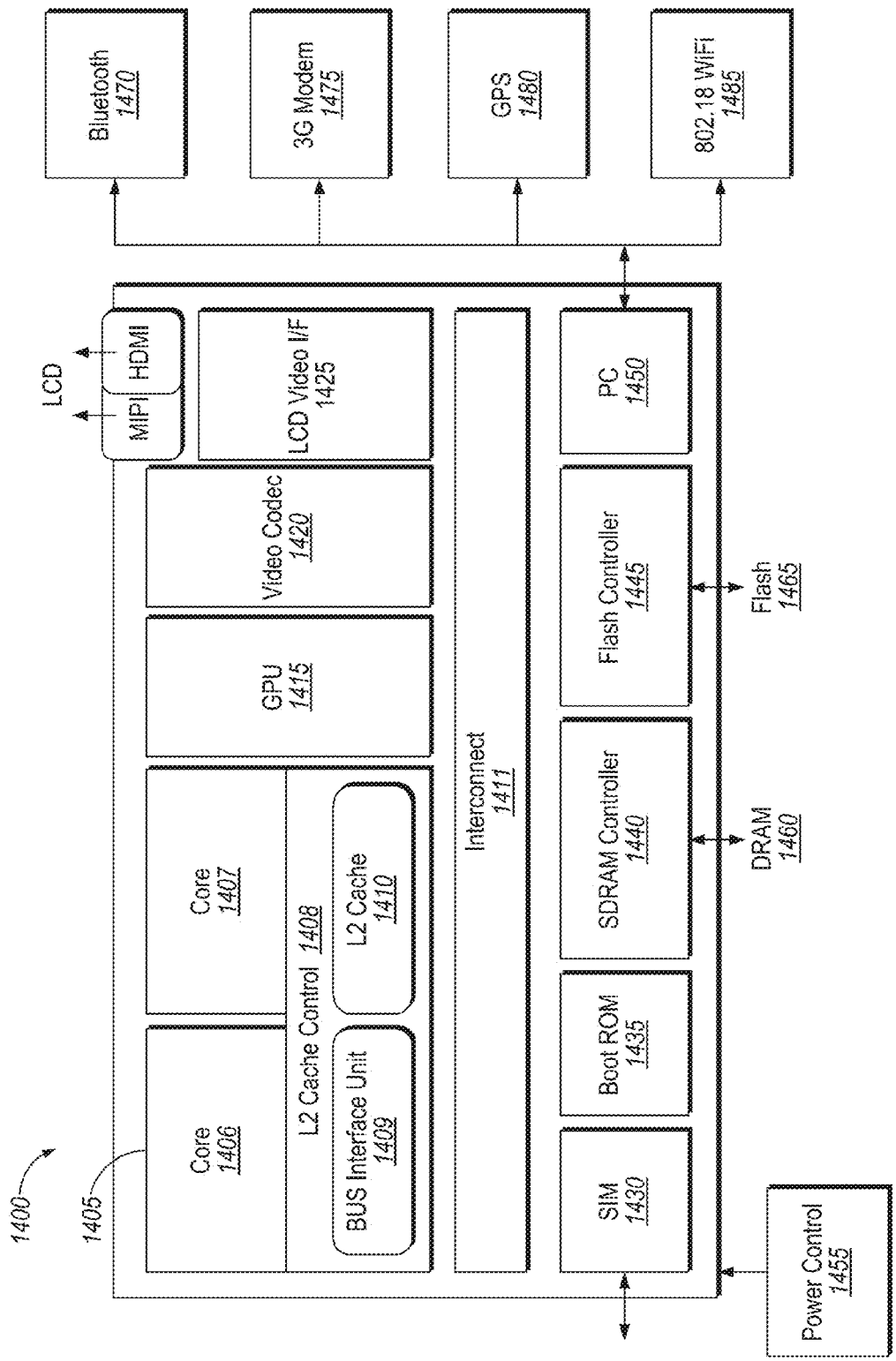
FIG. 14 illustrates another implementation of a block diagram for a computing system.

Turning next to FIG. 14, an embodiment of a system-on-a-chip (SoC) design in accordance with embodiments of the disclosure is depicted. As an illustrative example, SoC 1400 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE can connect to a base station or node, which can correspond in nature to a mobile station (MS) in a GSM network. The embodiments of the page additions and content copying can be implemented in SoC 1400.

Here, SoC 1400 includes 2 cores—1406 and 1407. Similar to the discussion above, cores 1406 and 1407 can conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of SOC 1400. Interconnect 1411 includes an on-chip interconnect, such as an IOSF, AMBA, or other interconnects discussed above, which can implement one or more aspects of the described disclosure.

Interconnect 1411 provides communication channels to the other components, such as a Subscriber Identity Module (SIM) 1430 to interface with a SIM card, a boot ROM 1435 to hold boot code for execution by cores 1406 and 1407 to initialize and boot SoC 1400, a SDRAM controller 1440 to interface with external memory (e.g., DRAM 1460), a flash controller 1445 to interface with non-volatile memory (e.g., Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces can incorporate aspects of the embodiments described herein.

In addition, the system illustrates peripherals for communication, such as a Bluetooth module 1470, 3G modem 1475, GPS 1480, and Wi-Fi 1485. Note as stated above, a UE includes a radio for communication. As a result, these peripheral communication modules can not all be included. However, in a UE some form of a radio for external communication should be included.

Figure 15:
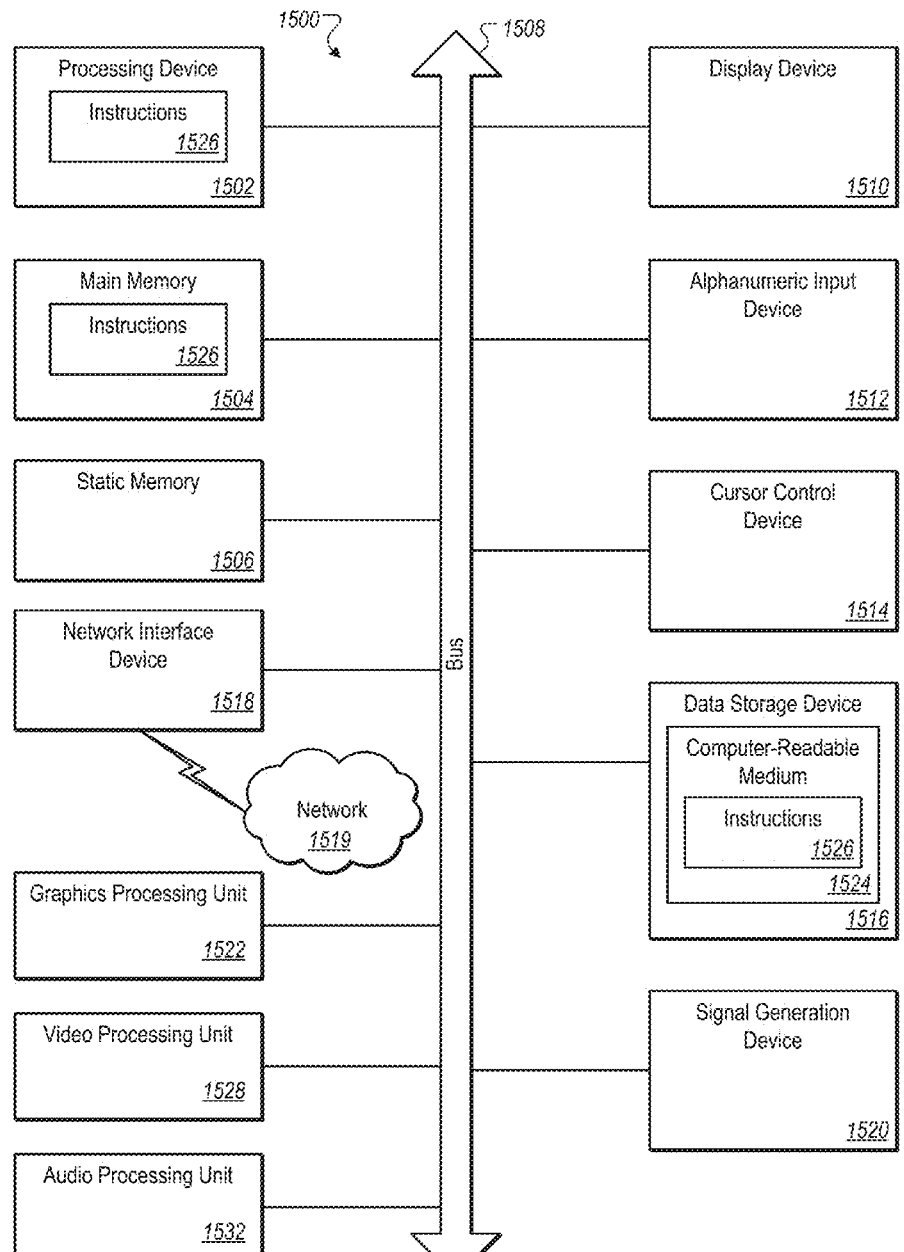
FIG. 15 illustrates another implementation of a block diagram for a computing system.

FIG. 15 illustrates a diagrammatic representation of a machine in the example form of a computing system 1500 within which a set of instructions, for causing the machine to perform any one or more of the methodologies discussed herein, can be executed. In alternative embodiments, the machine can be connected (e.g., networked) to other machines in a LAN, an intranet, an extranet, or the Internet. The machine can operate in the capacity of a server or a client device in a client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that execute the processing system 100 of FIG. 1 or the cryptographic accelerator 200 of FIG. 2, for example, can be implemented in or as a part of the computing system 1500.

The computing system 1500 includes a processing device 1502, main memory 1504 (e.g., flash memory, dynamic random access memory (DRAM) (such as synchronous DRAM (SDRAM) or DRAM (RDRAM), and the like), a static memory 1506 (e.g., flash memory, static random access memory (SRAM), etc.), and a data storage device 1516, which communicate with each other via a bus 1508.

Processing device 1502 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 can also be one or more special-purpose processing devices such as an application specific integrated circuit (ASIC), a field programmable gate array (FPGA), a digital signal processor (DSP), network processor, or the like. In one embodiment, processing device 1502 can include one or processor cores. The processing device 1502 is configured to execute the processing logic or instructions 1526 for performing the operations discussed herein.

In one embodiment, processing device 1502 can be the processing system 100 of FIG. 1 or the cryptographic accelerator 200 of FIG. 2, for example. Alternatively, the computing system 1500 can include other components as described herein. It should be understood that the core can support multithreading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1500 can further include a network interface device 1518 communicably coupled to a network 1519. The computing system 1500 also can include a video display device 1510 (e.g., a liquid crystal display (LCD) or a cathode ray tube (CRT)), an alphanumeric input device 1512 (e.g., a keyboard), a cursor control device 1514 (e.g., a mouse), a signal generation device 1520 (e.g., a speaker), or other peripheral devices. Furthermore, computing system 1500 can include a graphics processing unit 1522, a video processing unit 1528 and an audio processing unit 1532. In another embodiment, the computing system 1500 can include a chipset (not illustrated), which refers to a group of integrated circuits, or chips, that are designed to work with the processing device 1502 and controls communications between the processing device 1502 and external devices. For example, the chipset can be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1516 can include a computer-readable storage medium 1524 on which is stored software 1526 embodying any one or more of the methodologies of functions described herein. The software 1526 can also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 can also be used to store instructions 1526 utilizing the processing device 1502, such as described with respect to FIGS. 1-4, and/or a software library containing methods that call the above applications. While the computer-readable storage medium 1524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include The following examples pertain to further embodiments.

Example 1 is a processing system, comprising: a) a memory; and b) a cryptographic accelerator operatively coupled to the memory, wherein the cryptographic accelerator is to perform a split substitute byte operation within two paths of a cryptographic round by determining: i) a first output from a first path by applying a mapped affine transformation to an input bit sequence represented by an element of a composite field of a finite-prime field, wherein the first output is represented by a first element of the composite field of the finite-prime field; and ii) a second output from a second path by applying a scaled mapped affine transformation to the input bit sequence, wherein the second output is represented by a second element of the composite field and is equal to a multiple of the first output in the composite field.

In Example 2, the processing system of Example 1, wherein the cryptographic accelerator comprises 4-bit substitute byte circuitry to perform the split substitute byte operation in the composite field, wherein the second output is double the first output.

In Example 3, the processing system of Example 1, wherein the cryptographic accelerator further comprises a mixer including a plurality of summers, wherein each summer of the plurality of summers is to add one or more of the first output and one or more of the second output, to determine a mixed columns output for the cryptographic round.

In Example 4, the processing system of Example 1, wherein the first path operates parallel to the second path.

In Example 5, the processing system of Example 1, wherein the mapped affine transformation is represented by a matrix produced by multiplying a mapping matrix by a transformation matrix multiplied by an inverse of the mapping matrix.

In Example 6, the processing system of Example 5, wherein the mapping matrix represents a mapping from the finite-prime field to the composite field of the finite-prime field, wherein the finite-prime field is represented by a $GF(2^8)$ Galois field and the composite field is represented by a $GF(2^4)^2$ Galois field.

In Example 7, the processing system of Example 5, wherein contents of the mapping matrix is dictated by a pair of reduction polynomials associated with the composite field.

In Example 8, the processing system of Example 7, wherein the pair of reduction polynomials comprises $x^4+x^3+1$ and $x^2+4x+2$ for the composite field in an encryption design of the cryptographic accelerator.

In Example 9, the processing system of Example 7, wherein the pair of reduction polynomials comprises $x^4+x^3+1$ and $x^2+4x+6$ for the composite field in a decryption design of the cryptographic accelerator.

In Example 10, the processing system of Example 1, wherein the scaled mapped affine transformation is represented by a matrix produced by multiplying a mapping matrix by a scaling matrix that is multiplied by a transformation matrix, which is multiplied by an inverse of the mapping matrix.

In Example 11, the processing system of Example 1, wherein the cryptographic accelerator is to perform one of an Advanced Encryption Standard (AES) encryption operation or an AES decryption operation.

Various embodiments can have different combinations of the structural features described above. For instance, all optional features of the computing system described above can also be implemented with respect to the method or process described herein and specifics in the examples can be used anywhere in one or more embodiments.

Example 12 is a method comprising: a) splitting, by a cryptographic accelerator coupled to a memory of a processing system, a substitute byte operation of a cryptographic round into a first path and a second path; b) performing, by the cryptographic accelerator in the first path, a mapped affine transformation of an input bit sequence to produce a first output, wherein the input bit sequence is represented by an element of a composite field of a finite-prime field and the first output is represented by a first element of the composite field of the finite-prime field; and c) performing, by the cryptographic accelerator in the second path, a scaled mapped affine transformation of the input bit sequence to produce a second output that is equal to a multiple of the first output in the composite field, wherein the second output is represented by a second element of the composite field of the finite-prime field.

In Example 13, the method of Example 12, wherein the second output is double the first output and the scaled mapped affine transformation is a double mapped affine transformation.

In Example 14, the method of Example 12, further comprising adding, by a mixer of the cryptographic accelerator, one or more of the first output and one or more of the second output for each mixed columns output of the cryptographic round.

In Example 15, the method of Example 12, wherein the mapped affine transformation is represented by a matrix produced by multiplying a mapping matrix by a transformation matrix multiplied by an inverse of the mapping matrix.

In Example 16, the method of Example 15, wherein the mapped affine transformation is also represented by the mapping matrix multiplied by a vector of constants.

In Example 17, the method of Example 15, wherein the mapping matrix represents a mapping from the finite-prime field to the composite field of the finite-prime field, wherein the finite-prime field is represented by a $GF(2^8)$ Galois field and the composite field is represented by a $GF(2^4)^2$ Galois field.

In Example 18, the method of Example 12, wherein the scaled mapped affine transformation is represented by a matrix produced by multiplying a mapping matrix by a scaling matrix that is multiplied by a transformation matrix, which is multiplied by an inverse of the mapping matrix.

In Example 19, the method of Example 18, wherein the scaled mapped affine transformation is also represented by the mapping matrix multiplied by the scaling matrix, which is multiplied by a vector of constants.

Various embodiments can have different combinations of the structural features described above. For instance, all optional features of the computing system described above can also be implemented with respect to the method or process described herein and specifics in the examples can be used anywhere in one or more embodiments.

Example 20 is a processing system, comprising: a) a memory; and b) a cryptographic accelerator, operatively coupled to the memory, to: i) identify a mapped input bit sequence by applying a mapping transformation to an input bit sequence represented by a first element of a finite-prime field, wherein the mapped input bit sequence is represented by a first element of a composite field of the finite-prime field; ii) identify a mapped first key by applying the mapping transformation to an input key represented by a second element of the finite-prime field, wherein the mapped first key is represented by a second element of the composite field of the finite-prime field; iii) perform, within the composite field, at least one cryptographic round on the mapped input bit sequence, using the mapped first key during a first round of the at least one cryptographic round, to generate a processed bit sequence; and iv) identify an output bit sequence to be stored back in the finite-prime field by applying an inverse mapping transformation to the processed bit sequence.

In Example 21, the processing system of Example 20, wherein, to identify the mapped input bit sequence, the cryptographic accelerator is to employ a mapping matrix, wherein contents of the mapping matrix depends on a pair of reduction polynomials chosen for the composite field.

In Example 22, the processing system of Example 20, wherein, to identify the output bit sequence, the cryptographic accelerator employs an inverse mapping matrix, wherein contents of the mapping matrix depends on a pair of reduction polynomials chosen for the composite field.

In Example 23, the processing system of Example 20, wherein the composite field includes 4-bit circuitry, and wherein the finite-prime field is represented by a $GF(2^8)$ Galois field and the composite field is represented by a $GF(2^4)^2$ Galois field.

In Example 24, the processing system of Example 20, wherein the memory and the cryptographic accelerator are integrated within a system-on-a-chip (SOC).

Various embodiments can have different combinations of the structural features described above. For instance, all optional features of the computing system described above can also be implemented with respect to the method or process described herein and specifics in the examples can be used anywhere in one or more embodiments.

Example 25 is a processing system comprising: a) a memory; and b) a cryptographic accelerator, operatively coupled to the memory, to perform a plurality of cryptographic rounds, wherein the cryptographic accelerator includes a plurality of round circuits, wherein each round circuit of the plurality of round circuits comprises customized logic that determines a round-specific constant of a plurality of round-specific constants for use during a current cryptographic round, and wherein the customized logic also maps the round-specific constant from a finite-prime field to an element of a composite field of the finite-prime field before being used to generate a key for a next round.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
   a memory; and
   a cryptographic hardware accelerator operatively coupled to the memory, wherein the cryptographic hardware accelerator comprises:
      a substitute byte (S-box) circuit comprising split S-box circuitry to perform a split substitute byte operation within two hardware paths for a cryptographic round to generate:
         a first output from a first hardware path by applying a mapped affine transformation to an input bit sequence received from the memory and represented by an element of a composite field of a finite-prime field, wherein the first output is represented by a first element of the composite field of the finite-prime field; and
         a second output from a second hardware path by applying a scaled mapped affine transformation to the input bit sequence, wherein the second output is represented by a second element of the composite field and is equal to a multiple of the first output in the composite field; and
      a mixer circuit coupled to the S-box circuit, wherein the mixer circuit is to generate a mixed columns output for the cryptographic round through addition of the first output and the second output from the S-box circuit.

2. The processing system of claim 1, wherein the S-box circuit comprises 4-bit substitute byte circuitry to perform the split substitute byte operation in the composite field, wherein the second output is double the first output.

3. The processing system of claim 1, wherein the mixer circuit comprises a plurality of summers, wherein each summer of the plurality of summers is to add one or more of the first output and one or more of the second output, to determine the mixed columns output for the cryptographic round.

4. The processing system of claim 1, wherein the first hardware path operates in parallel to the second hardware path.

5. The processing system of claim 1, wherein the mapped affine transformation is represented by a matrix produced by multiplying a mapping matrix by a transformation matrix multiplied by an inverse of the mapping matrix.

6. The processing system of claim 5, wherein the mapping matrix represents a mapping from the finite-prime field to the composite field of the finite-prime field, wherein the finite-prime field is represented by a $GF(2^8)$ Galois field and the composite field is represented by a $GF(2^4)^2$ Galois field.

7. The processing system of claim 5, wherein contents of the mapping matrix is dictated by a pair of reduction polynomials associated with the composite field.

8. The processing system of claim 7, wherein the pair of reduction polynomials comprises $x^4+x^3+1$ and $x^2+4x+2$ for the composite field in an encryption design of the cryptographic accelerator.

9. The processing system of claim 7, wherein the pair of reduction polynomials comprises $x^4+x^3+1$ and $x^2+4x+6$ for the composite field in a decryption design of the cryptographic accelerator.

10. The processing system of claim 1, wherein the scaled mapped affine transformation is represented by a matrix produced by multiplying a mapping matrix by a scaling matrix that is multiplied by a transformation matrix, which is multiplied by an inverse of the mapping matrix.

11. The processing system of claim 1, wherein the cryptographic accelerator is to perform one of an Advanced Encryption Standard (AES) encryption operation or an AES decryption operation.

12. A method comprising:
splitting, by a substitute byte (S-box) circuit of a cryptographic hardware accelerator coupled to a memory of a processing system, a substitute byte operation of a cryptographic round into a first hardware path and a second hardware path;
performing, by the S-box circuit in the first hardware path, a mapped affine transformation of an input bit sequence received from the memory, to produce a first output, wherein the input bit sequence is represented by an element of a composite field of a finite-prime field and the first output is represented by a first element of the composite field of the finite-prime field;
performing, by the S-box circuit in the second hardware path, a scaled mapped affine transformation of the input bit sequence to produce a second output that is equal to a multiple of the first output in the composite field, wherein the second output is represented by a second element of the composite field of the finite-prime field; and
adding, by a mixer of the cryptographic hardware accelerator coupled to the S-box circuit, at least one of the first output and one of the second output to generate a mixed columns output for the cryptographic round.

13. The method of claim 12, wherein the second output is double the first output and the scaled mapped affine transformation is a double mapped affine transformation.

14. The method of claim 12, further comprising adding, by the mixer of the cryptographic accelerator, one or more of the first output and one or more of the second output for each mixed columns output of the cryptographic round.

15. The method of claim 12, wherein the mapped affine transformation is represented by a matrix produced by multiplying a mapping matrix by a transformation matrix multiplied by an inverse of the mapping matrix.

16. The method of claim 15, wherein the mapped affine transformation is also represented by the mapping matrix multiplied by a vector of constants.

17. The method of claim 15, wherein the mapping matrix represents a mapping from the finite-prime field to the composite field of the finite-prime field, wherein the finite-prime field is represented by a $GF(2^8)$ Galois field and the composite field is represented by a $GF(2^4)^2$ Galois field.

18. The method of claim 12, wherein the scaled mapped affine transformation is represented by a matrix produced by multiplying a mapping matrix by a scaling matrix that is multiplied by a transformation matrix, which is multiplied by an inverse of the mapping matrix.

19. The method of claim 18, wherein the scaled mapped affine transformation is also represented by the mapping matrix multiplied by the scaling matrix, which is multiplied by a vector of constants.

\* \* \* \* \*